(12) United States Patent
Tadaishi et al.

(10) Patent No.: US 8,941,642 B2
(45) Date of Patent: Jan. 27, 2015

(54) SYSTEM FOR THE CREATION AND EDITING OF THREE DIMENSIONAL MODELS

(75) Inventors: Mitsuaki Tadaishi, Tokyo (JP); Akira Iwata, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 1016 days.

(21) Appl. No.: 12/577,878

(22) Filed: Oct. 13, 2009

(65) Prior Publication Data
US 2010/0097375 A1    Apr. 22, 2010

(30) Foreign Application Priority Data

| Oct. 17, 2008 | (JP) | 2008-268636 |
| Feb. 13, 2009 | (JP) | 2009-32021 |
| Apr. 14, 2009 | (JP) | 2009-98484 |
| Sep. 7, 2009 | (JP) | 2009-205665 |

(51) Int. Cl.
*G06T 15/00* (2011.01)
*A63F 13/40* (2014.01)

(52) U.S. Cl.
CPC ......... *A63F 13/10* (2013.01); *A63F 2300/6009* (2013.01)
USPC ............................. 345/419; 345/420; 345/473

(58) Field of Classification Search
None
See application file for complete search history.

(56) References Cited

U.S. PATENT DOCUMENTS

| 5,267,154 A | 11/1993 | Takeuchi et al. |
| 5,615,318 A | 3/1997 | Matsuura |
| 5,850,222 A * | 12/1998 | Cone .............................. 345/418 |
| 5,909,218 A | 6/1999 | Naka et al. |
| 6,404,426 B1 * | 6/2002 | Weaver .......................... 345/419 |
| 6,434,525 B1 | 8/2002 | Nagisa et al. |
| 6,545,682 B1 | 4/2003 | Ventrella et al. |
| 6,970,177 B2 | 11/2005 | Yamada et al. |
| 2001/0026272 A1 * | 10/2001 | Feld et al. ..................... 345/419 |

(Continued)

FOREIGN PATENT DOCUMENTS

| EP | 0804032 | 10/1997 |
| GB | 2450757 | 1/2009 |

(Continued)

OTHER PUBLICATIONS

Suzuki, "Poser 6. MAC Power", Asky Co., Ltd. No. 16 volume, No. 4, Apr. 1, 2005, pp. 121-128, and an English language translation of the Abstract.

(Continued)

*Primary Examiner* — Said Broome
(74) *Attorney, Agent, or Firm* — Greenblum & Bernstein, P.L.C.

(57) ABSTRACT

A three-dimensional model display device and a model display system in which even a beginner can easily edit a model, and edit and watch a moving image using a model while maintaining harmony of a model, a texture, and a motion. When a user clicks a selection button of "trying-on", performed is a preview display about how an avatar possessed by the user is displayed when the avatar wears a cloth, a hairstyle, an item, and an accessory desired to be tried on. A head size, a body portion size, and a bust portion size of the avatar possessed by the user are managed in a user management table. Display data related to the preview display displayed on the display screen of the model display device is dynamically generated by a model display server based on the head size, the body portion size, and the bust portion size.

19 Claims, 26 Drawing Sheets

(56) References Cited

U.S. PATENT DOCUMENTS

| | | |
|---|---|---|
| 2003/0214518 A1 | 11/2003 | Yamada et al. |
| 2005/0075557 A1 | 4/2005 | Kamiyama |
| 2005/0137015 A1 | 6/2005 | Rogers et al. |
| 2005/0143174 A1 | 6/2005 | Goldman et al. |
| 2007/0197296 A1 | 8/2007 | Lee |
| 2008/0062198 A1 | 3/2008 | Takahashi et al. |
| 2009/0061993 A1 | 3/2009 | Fujimoto |
| 2010/0164987 A1 | 7/2010 | Takahashi et al. |
| 2010/0203968 A1 | 8/2010 | Gill et al. |

FOREIGN PATENT DOCUMENTS

| | | |
|---|---|---|
| JP | 62-126468 | 6/1987 |
| JP | 4-195476 | 7/1992 |
| JP | 5-266149 | 10/1993 |
| JP | 10-302085 | 11/1998 |
| JP | 11-250282 | 9/1999 |
| JP | 11-339058 | 12/1999 |
| JP | 2001-052203 | 2/2001 |
| JP | 2003-103047 | 4/2003 |
| JP | 2004-30502 | 1/2004 |
| JP | 2004-46793 | 2/2004 |
| JP | 2007/133776 | 5/2007 |
| JP | 2007-133776 | 5/2007 |
| JP | 2008-061896 | 3/2008 |
| JP | 2008-510563 | 4/2008 |
| JP | 2009-050602 | 3/2009 |

OTHER PUBLICATIONS

Ishizaki, "Softimage/XSIv1.5, CG World", Works Corporation, Japan, No. 31 volume, Mar. 1, 2001, pp. 160-163, and an English language translation of the Abstract.

Sugiyama, "Softimage/XSI Character Animation zukuride Kazen Haaku!", CG World, Works Corporation, No. 23 volume, Jul. 1, 2000, pp. 70-75, and an English language translation of the Abstract.

Japan Office Action for JP 2009-032021, dated Oct. 26, 2010, along with a partial English language translation thereof.

European Search Report for EP 09 17 2954, dated Dec. 22, 2010.

Japan Office Action in JP 2009-205665, dated Jan. 10, 2012 along with an English language translation thereof.

Japan Office Action in JP 2009-032021, dated Feb. 1, 2011, along with an english translation thereof.

Japan Office action, dated Jul. 5, 2011 along with an english translation thereof.

European Search Report in EP 11 17 6946, dated Nov. 3, 2011.

European Search Report in EP 11 17 6948, dated Nov. 3, 2011.

English language Abstract of JP 2008-061896, Mar. 21, 2008.

English language Abstract of JP 2008-510563, Apr. 10, 2008.

English language Abstract of JP 10-302085, Nov. 13, 1998.

English language Abstract of JP 2009-050602, Mar. 12, 2009.

* cited by examiner (a)

| 401 | 402 SETTING TIME | 403 SETTING |
|---|---|---|
| CAMERA | 0 | FOCUS : CHARACTER 1 ROTATION |
| CAMERA | 20 | FOCUS : CHARACTER 2 ZOOM |
| SOUND | 0 | ROCK |
| BACKGROUND | 0 | SUMMER SEA |
| COMMENT | 10 | CHARACTER 1 "HI" |
| COMMENT | 15 | CHARACTER 2 "HI" |
| COMMENT | 35 | CHARACTER 1 "IT IS NICE WEATHER" |
| MOTION | 0 | DANCE(STEP) |
| ⋮ | ⋮ | ⋮ |

FIG. 19

| | USER ID | HEAD SIZE | BUST SIZE | HEAD-SIZED BODY | HEAD DATA ID | EDIT DATA ID | VIRTUAL CURRENCY | ·· |
|---|---|---|---|---|---|---|---|---|
| 404 | 10001 | 1.0 | 2 | 2 | ID12569 | ID95638 ID95628 | 1300Mt | ·· |
| | 10002 | 2.5 | 4 | 3 | ID12384 | ID91915 ID91234 | 258Mt | ·· |
| | ⋮ | ⋮ | ⋮ | ⋮ | ⋮ | ⋮ | ⋮ | |

Column labels: 405, 406, 407, 408, 409, 410, 411

SYSTEM FOR THE CREATION AND EDITING OF THREE DIMENSIONAL MODELS

BACKGROUND OF THE INVENTION

1. Technical Field

The present invention relates to a three-dimensional (3D) model display device and a 3D model display system in which even a beginner can easily edit a 3D model, and edit and watch a moving image using a 3D model while maintaining harmony of a model, a texture, and a motion.

2. Related Art

Conventionally, communication via the Internet had been performed in one-to-one, but in recent years, it has become possible to simultaneously communicate with a plurality of users in a shared virtual 3D space on a network. Avatars have been used as virtual characters representing individual users.

The avatars used in the communication space are usually doll characters. Since the avatar is used as a user-specific character, portions such as eyes, a nose, and a mouth which are prepared for respective parts of a face used in the doll character are combined by an operation of the user to make an avatar which looks like a user himself/herself (for example, see Japanese Patent Application Laid-Open (JP-A) No. 2008-61896). Therefore, it is discriminated from an avatar used by other user in the virtual three-dimensional space. On the other hand, in order to represent physical features excluding a face, in the case of the doll character, in addition to a physique difference of males and females or adults and kids, an avatar wears a cloth, whereby individuality of each user is expressed (for example, see JP-A No. 2008-510563).

Components of a 3D character include a model which is solid figure information, a texture which is design information attached to the model, and a motion which is information for defining an action path of the model. The components do not exist independently but are organically associated with each other. This is the reason why it is not easy to edit the 3D character. Let us assume a case of editing the model. For example, when only a leg of a body of a doll character is changed in length, it is necessary to determine treatment of the texture (for example, a design of trousers) mapped with the leg. This is because since the texture is defined to be arranged relatively to the model having a predetermined size and shape, if a size and shape of the model are changed, a criterion of the arrangement is lost, and the texture cannot be expressed in that state. Similarly, if the model is edited, it is necessary to determine treatment of the motion. This is because since the motion is one which defines a movement locus of the model having a predetermined size and joint distance, when the model is changed, a definition target is lost. As described above, since it is not easy to edit while maintaining harmony of the model, the texture, and the motion, it was difficult for a beginner to treat the 3D character.

A technique is disclosed that sets a plurality of independent record tracks corresponding to respective joints of a model in order to confer a complicated movement to a computer graphic (CG) model such as an avatar using an input means with a simplified configuration, sets record enable/disable information representing whether or not to record in each record track, and records time-series data only in a record track set to record enable based on an input control amount, so that time-series data of a joint angle is additionally recorded for each joint (for example, see JP-A No. 10-302085).

Besides, a technique is disclosed that in order to construct a highly reliable item transaction with monetary transfer, subtracts a purchase amount from a cash of a player which has purchased an item, determines whether or not a donation flag of the player as a seller is ON, and transmits a donation amount corresponding to a sales amount to a donation management server when the donation flag is ON, wherein the donation management server receives the donation amount, adds it to a current donation amount, and performs updating (for example, JP-A No. 2009-050602).

SUMMARY

The present invention is directed to a 3D model display device and a 3D model display system in which even a beginner can easily edit a 3D model, and edit and watch a moving picture using a 3D model while maintaining harmony of the model, the texture, and the motion.

The present invention relates to a 3D design support apparatus which supports creation of a surface design of a 3D model, and more particularly to, a 3D design support apparatus which includes a model data storage which stores model data of respective components which configure a 3D model disposed in a virtual 3D space, a model data changer which changes a virtual skeleton of the respective components set to the 3D model according to an operation of an input device by a user to change model data of the respective components stored in the model data storage, a model data calculator which calculates model data of the 3D model according to the changed model data of the respective components, and a 3D model display device which renders the model data of the 3D model calculated by the model data calculator and displays as a two-dimensional (2D) image on a display device.

According to the present invention, an edit of the 3D model can be easily executed by executing enlargement, reduction or a ratio change of the respective components of the 3D model through the model data changer. For example, the 3D model may be divided into three components of a head, a portion below from a neck (excluding a bust), and a bust, and a head size, a ratio (a head-sized body) of a height and a head length, a bust size can be changed. In the case of changing the head size, the whole head is enlarged or reduced. In the case of changing the ratio of the height and the head length, the body size can be adjusted while maintaining the head size of the 3D model, and it is possible to edit a cute character with a 2 head-sized body or a character with a 6 to 8 head-sized body which is close to an actual person. In the case of changing the bust size, the bust size is changed by transforming a virtual skeleton of a bust portion in a virtual skeleton which configures the 3D model.

Preferably, provided are an expansion view storage which stores an expansion view in which a surface shape of the 3D model is two-dimensionally expanded, an expansion view correspondence relationship storage which stores a correspondence relationship between the model data and the expansion view of the respective components, an expansion view editor which edits the expansion view stored in the expansion view storage according to an operation of an input device by a user, a model data editor which edits the model data stored in the model data storage according to an operation of the input device by the user, an edit method switcher which selects one of the expansion view editor and the model data editor to execute an edit through the input device according to an operation of the input device by the user, and a model data calculator which calculates the model data of the 3D model according to the model data edited by the model data editor, the expansion view edited by the expansion view editor, and a correspondence relationship between the model data and the expansion view stored in the expansion view correspondence relationship storage. Since a 2D edit using the expansion view and a 3D edit are switched with each other, an edit can be executed while confirming a 3D edit result. Therefore, even beginner can instinctively perform an edit job without performing a complicated operation.

Preferably, provided are a motion program storage which stores a motion program which confers a predetermined motion to the 3D model in the virtual 3D space, and a motion program executer which executes the motion program based on the model data of the 3D model calculated by the model data calculator. Since a proportion or a design of the 3D model can be edited while having the 3D model to execute a motion, the user can confirm how the 3D model which is executing a certain motion is displayed in real time. Therefore, even a beginner can instinctively perform an edit job.

Preferably, provided are an expansion view storage which stores an expansion view in which a surface shape of the 3D model is two-dimensionally expanded, an expansion view correspondence relationship storage which store a correspondence relationship of the model data of the respective components stored in the model data storage and the expansion view stored in the expansion view storage, a 2D image storage which stores a 2D image arbitrarily selected by the user, a superimposing displayer which superimposes the expansion view stored in the expansion view storage with the 2D image stored in the 2D image storage and displays the superimposed image on a display device, a position changer which changes a position of at least one of the expansion view and the 2D image which are superimposed and displayed by the superimposing displayer according to an operation of the input device by the user, an image paster which paste the 2D image superimposed with the expansion view to the model data stored in the model data storage and displayed according to the correspondence relationship between the model data and the expansion view of the respective components stored in the expansion view correspondence relationship storage, and an image pasting model displayer which displays the model data to which the 2D image is pasted by the image paster on the display device. The user can design a surface design of the 3D model to which an arbitrary image is pasted by a simple operation of adjusting a position of the arbitrary 2D image with respect to the expansion view of the 3D model. Further, since the 2D image can be arbitrarily selected, a design width is not narrowed.

The present invention relates to a computer readable medium that stores an executable computer program which causes a computer to execute creation of a surface design of a 3D model, the computer readable medium including: an executable model data storing code segment stored on the computer readable medium that, when executed, causes the computer to store model data of respective components which configure a 3D model disposed in the virtual 3D space, an executable model data changing code segment stored on the computer readable medium that, when executed, causes the computer to change a virtual skeleton of the respective components set to the 3D model according to an operation of an input device by a user to change model data of the respective components stored in the model data storage, an executable model data calculating code segment stored on the computer readable medium that, when executed, causes the computer to calculate model data of the 3D model according to the changed model data of the respective components, and an executable 3D model displaying code segment stored on the computer readable medium that, when executed, causes the computer to render the model data of the 3D model calculated by a model data calculating code segment and to display as a two-dimensional (2D) image on a display device.

The present invention relates to a three-dimensional (3D) model display system, including: a 3D model display device which displays a 3D model allocated to each user; and a 3D model display server connected with the 3D model display device via a communication line, wherein the 3D model display device includes: a model data editor which edits setting related to sizes of respective components which configure the 3D model and display data of the respective components according to an operation of an input device by a user; a model data transmitter which transmits edit model data, edited by the model data editor, which relates to setting related to the sizes of the respective components which configure the 3D model and display data of the respective components, to the 3D model display server; a wearing item selection receiver which receives selection of a wearing item to be worn by the 3D model according to an operation of the input device by the user; and a wearing item information transmitter which transmits wearing item information related to the wearing item received by the wearing item selection receiver to the 3D model display server, the 3D model display server includes: a model data receiver which receives the edit model data from the 3D model display device; a model data storage which stores the edit model data received by the model data receiver; a wearing item display data storage which stores a plurality of wearing item display data; a wearing item correspondence relationship storage which stores a correspondence relationship between each wearing item and each component which configures the 3D model; a wearing item information receiver which receives the wearing item information from the 3D model display device; a wearing item display data changer which changes, with respect to the wearing item corresponding to the wearing item information received by the wearing item information receiver, display data of the wearing item stored in the wearing item display data storage according to setting related to the sizes of the respective components stored in the model data storage and a relationship between the wearing item and the respective components stored in the wearing item correspondence relationship storage; a model display data specifier which specifies the display data of the 3D model based on setting related to the sizes of the respective components and the display data of the respective components stored in the model data storage and the display data of the wearing item changed by the wearing item display data changer; and a model display data transmitter which transmits the display data of the 3D model specified by the model display data specifier to the 3D model display device, and the 3D model display device displays the display data of the 3D model received from the 3D model display server as a two-dimensional image.

The 3D model display device and the 3D model display server according to the present invention are connected with each other through a communication line such as the Internet. The user can execute an edit of the 3D model (an avatar) using the 3D model display device. The user can access the 3D model display server (a web site) through a browser from the 3D model display device and purchase a cloth, an item, and an accessory (hereinafter, referred to as an "item etc.") to be worn by the 3D model. At this time, the user may desire to try the item etc. on the 3D model and confirm how the 3D model wearing the item etc. is displayed without suddenly purchasing the item etc. to be worn by the 3D model.

The 3D model display device according to the present invention can simply execute an edit of the 3D model by executing enlargement, reduction, or a ratio change of the respective components of the 3D model. The 3D model may be divided into three components of a head, a portion below from the neck (excluding the bust), and a bust, and a head size, a ratio (a head-sized body) of a height and a head length, and a bust size can be changed.

When the avatar has diversity by changing the head size, the ratio (the head-sized body) of the height and the head length, and the bust size as well as the face expression or sex of the avatar, it may be unnatural to wear an item etc. which can be purchased through the web site since its size is not appropriate according to a physique of the avatar. Therefore, if an item can be worn regardless the physique of the avatar, the item purchase of the user can be promoted. When all items can be worn regardless of the physique of the avatar, a display form of a wearing item may be remarkably different from a form displayed before the purchase depending on the physique of the avatar. Therefore, it is preferred to confirm how the avatar wearing the item is displayed in a try-on step.

In the 3D model display device, a display size of display data of individual wearing items (for example, a hairstyle, an outer cloth, trousers, and an accessory) is changed according to a correspondence relationship between the respective components (for example, a head, a body portion, and a bust portion) which configure the 3D model and the wearing item and setting related to sizes of the respective components changed by an operation of the input device by the user. Display data of the whole 3D model is specified based on the changed display data. When the wearing item is a hairstyle or an accessory worn on the head, a display size of the hairstyle or the accessory is increased in proportion to a head size. The hairstyle or the accessory worn on the head is not affected by the ratio (the head-sized body) of the height and the head length. On the other hand, when the wearing item is an outer cloth worn on the upper body of the 3D model, a display size of the outer cloth is increased in proportion to the ratio of the height and the head length, but is not affected by a change of the head size.

Even when the user accesses the 3D model display server to try the wearing item on, information (the head size, the ratio (the head-sized body) of the height and the head length, and the bust size) of the 3D model possessed by the user may be transmitted to or previously stored in the 3D model display server. In this case, display data of individual wearing items is changed according to a correspondence relationship between the respective components which configure the 3D model and the wearing item and setting related to changed sizes of the respective components. Since display data of the whole 3D model is specified base on the changed display data, any item can be tried on regardless of the physique of the avatar, and it is possible to confirm how the avatar wearing the item is displayed through a preview display by the browser.

In the present invention, the 3D model display device further includes a wearing item editor which edits display data of the wearing item. Preferably, the wearing item selected by the wearing item selection receiver is a wearing item in which display data is edited by a wearing item editor of a different 3D model display device.

A service in which a cloth, an item, and an accessory to be worn by the 3D model can be purchased on a web site is still now present. However, a cloth etc. is provided from an operator side of the web site, and thus they are not so diverse or rich in individuality that users can sufficiently enjoy them. The 3D model display device according to the present invention has a function of editing display data of the wearing item, and the wearing item is an item edited by a 3D model display device of other user. Therefore, the user can boast and inform an item edited by him/her to other users and enjoy wearing an item having an excellent design created by other user on his/her avatar. Further, since a design of an item can be further edited based on an item having an excellent design created by other user, the 3D model display system by which items having a complicated design may be easily edited, and having diversity or individuality sufficient for the user to enjoy can be provided.

The present invention relates to a three-dimensional (3D) model display system, including: a 3D model display device which displays a 3D model allocated to each user; and a 3D model display server connected with the 3D model display device via a communication line, wherein the 3D model display device includes: a model data editor which edits setting related to sizes of respective components which configure the 3D model and display data of the respective components according to an operation of an input device by a user; a model data transmitter which transmits edit model data, edited by the model data editor, which relates to setting related to the sizes of the respective components which configure the 3D model and display data of the respective components, to the 3D model display server; a moving image program selection receiver which receives selection of a moving image program which has the 3D model to execute a predetermined motion according to an operation of an input device by a user; and a moving image program information transmitter which transmits moving image program information related to the moving image program received by the moving image program selection receiver to the 3D model display server, the 3D model display server includes: a model data receiver which receives the edit model data from the 3D model display device; a model data storage which stores the edit model data received by the model data receiver; a moving image program storage which stores moving image programs which have the 3D model to execute a predetermined motion; a moving image program information receiver which receives the moving image program information from the 3D model display device; a moving image data specifier which specifies moving image data of a moving image program when the moving image program is executed according to edit model data stored in the model data storage, the moving image program corresponding to the moving image program information received by the moving image program information receiver among the moving image programs stored in the moving image program storage; and a moving image data transmitter which transmits the moving image data specified by the moving image data specifier to the 3D model display device, and the 3D model display device displays the moving image data received from the 3D model display server as a two-dimensional image.

In the 3D model display system according to the present invention, moving image data at the time of execution of the moving image program is specified according to setting related to sizes of the respective components which configure the 3D model. Therefore, even though the physique of the 3D model is changed, the moving image program is executed without any discomfort. Even when the user accesses the 3D model display server to execute the preview display of the moving image program which the user desires to purchase, if model data (setting related to sizes of the respective components) of the 3D model possessed by the user has been already transmitted to the 3D model display sever or previously stored in the 3D model display server, the user's 3D model can be applied to the moving image program regardless of the physique of the 3D model and preview-displayed without any discomfort. Even after the moving image program is purchased, the user's 3D model can be applied to the moving image and displayed in the 3D model display device without any discomfort.

Further, even in this case, display data of individual wearing items (for example, a hairstyle, an outer cloth, trousers, and an accessory) is changed according to a correspondence relationship between the respective components (for example, a head, a body portion, and a bust portion) which configure the 3D model and the wearing item and setting related to sizes of the respective components changed by an operation of the input device by the user, and display data of the whole 3D model is specified based on the changed display data. Further, even when the user accesses the 3D model display server to request a preview display of motion data which the user desires to purchase, display data of individual wearing items is changed according to a correspondence relationship between the respective components which configure the 3D model and an item of the moving image program worn by the 3D model and sizes of the components of the 3D model. Since display data of the whole 3D model is specified based on the changed display data, an item is worn by the avatar in a natural form without any discomfort regardless of the physique of the avatar, and then the moving image program is executed.

Preferably, according to the present invention, the moving image program moves virtual joints, which configure a virtual skeleton set to the 3D model, to different positions according to a lapse of program execution time to confer a motion to the 3D model, and the virtual joints are moved to the different positions according to predetermined angles before and after movement of the virtual joints with respect to an angle of virtual joints formed by the virtual skeleton and an predetermined angle speed at the time of movement of the virtual joints.

When a preview display of the moving image program which the user desires to purchase is executed, the virtual joints are moved to different positions according to an angle formed in the predetermined virtual joints and an angle speed of the angle at the time of movement of the virtual joints, and thus a moving distance and a moving speed of the virtual joints are changed according to setting related to sizes of the respective components while maintaining a moving direction of the virtual joints. Therefore, the user's 3D model can be applied to the moving image program regardless of the physique of the 3D model and preview-displayed without any discomfort. Even after the moving image program is purchased, the user's 3D model can be applied to the moving image and displayed in the 3D model display device without any discomfort.

Preferably, according to the present invention, the moving image program generates a voice by predetermined voice data according to a lapse of program execution time, displays a text according to a lapse of program execution time, and/or changes a position, a focus, or a direction of a virtual camera which displays a two-dimensional image according to a lapse of program execution time.

The moving image program can be applied to a movie program which has functions of generating a voice based on voice data, displaying a text, and changing an observing point of the virtual camera as well as a motion program which simply has the 3D model to execute a predetermined motion.

Preferably, according to the present invention, the 3D model display device further includes a moving image program editor which edits the moving image program, and the moving image program selected by the moving image program selection receiver is a moving image program edited by a moving image program editor of a different 3D model display device.

The user may desire to enjoy creating a moving image using his/her avatar and showing the created moving image to other user or making his/her avatar appear in a funny moving image created by other user. However, creating the moving image from scratch gives a large burden to the user. In the 3D model display system of the present invention, a moving image program created by other user can be purchased regardless of the physique of the avatar, and the moving image program can be applied to his/her avatar and preview-displayed.

Functions of the 3D model display device (the 3D design support apparatus) of the present invention will be described below. The 3D model display device of the present invention has not only a model edit function, an edit-in-motion function, and a 2D/3D switching edit function described below but also a motion edit function for editing a motion of the 3D model and a movie edit function for conferring words to the 3D model based on voice data or a text.

1. Model Edit Function (1) A target in which model data can be changed is limited to the head-sized body, the bust, and the head. That is, model data is divided into three portions of the head, the portion below from the neck (excluding the bust), and the bust and managed, and the three portions may be individually enlarged or reduced. Since the three portions can be individually enlarged or reduced, most of variations of a doll character can be covered.

(2) The reason for dividing the model data as described above is because the three portions are portions in which motion data do not affect each other. For example, when the arm and the leg are edited as separate models, the data have to be re-constructed in most of motions such as a running motion or a dancing motion. However, if only a head model or only a model corresponding to a portion below from a neck is edited as in the present invention, motion data can be treated by simple enlargement or reduction.

(3) Another reason for dividing the model data as described above is because a texture to be mapped does not straddle both portions or even though a texture to be mapped straddles both portions, its affection is small. For example, when the body and the leg are edited as separate models, for example, in the case of texture-mapping a design of a one-piece dress, an enlarged or reduced size of a design differs in the body and the leg and thus becomes unnatural. However, according to the present invention, it can be treated by simple enlargement or reduction of the texture suitable for a model (since a change rate of enlargement or reduction of the bust portion is not large, it is unnoticeable).

2. Edit-in-Motion

As a function for further increasing an effect of the "model edit function" according to the present invention, there is an "edit-in-motion" function. Since an edit is executed while having a model to execute a motion, even a beginner can instinctively grasp the edit result and thus edit while maintaining harmony of a model, a texture, and a motion.

3. 2D/3D Switching Edit

Since the texture itself is 2D data, an edit by a 2D display is basic for the sake of an accurate and precise edit. However, this cannot make it possible to perform a job while actually confirming the 3D edit result when editing while maintaining harmony of a model, a texture, and a motion. The "2D/3D switching edit" helps a beginner to instinctively perform a job. The reason that there was conventionally no 2D/3D switching edit is because a reading standby time for switching is long since the whole rendering has to be performed at each time of switching. It is difficult to provide a service at a practical level even through a current high-specification machine performance. In this regard, since CG data to be handled is small in the case of "avatar dedicated", a problem of a processing speed does not occur in the first place.

BRIEF DESCRIPTION OF THE DRAWINGS

FIG. 18 is a view illustrating a moving image program management table;

FIG. 19 is a view illustrating a user management table;

DETAILED DESCRIPTION

Figure 1:
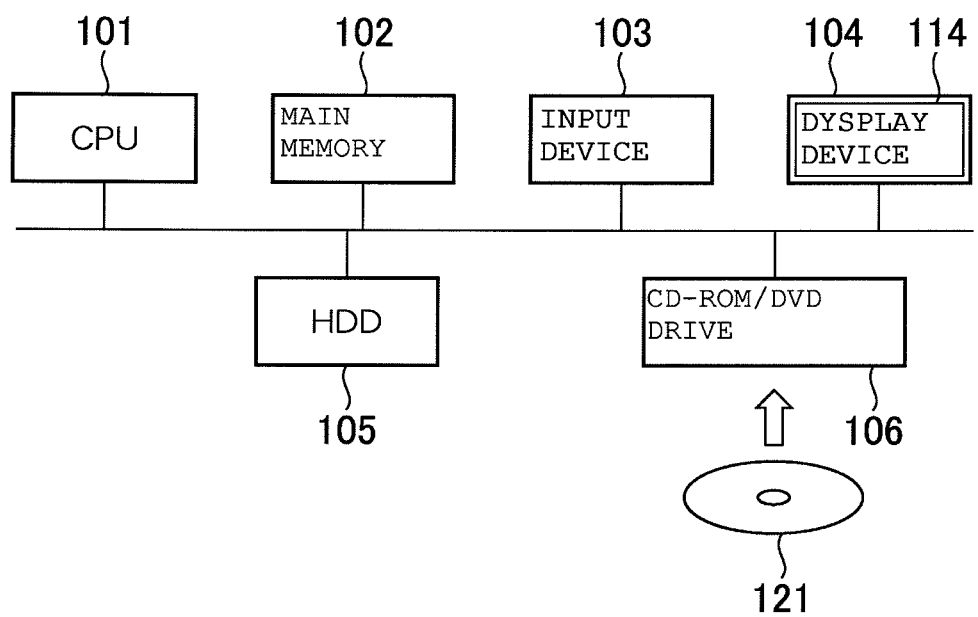
FIG. 1 is a block diagram illustrating a configuration of a three-dimensional (3D) design support apparatus according to an exemplary embodiment of the present invention.

Hereinafter, embodiments of the present invention will be described with reference to the accompanying drawings. FIG. 1 is a block diagram illustrating a configuration of a 3D model display device according to an exemplary embodiment. As illustrated in FIG. 1, the 3D model display device includes a central processing unit (CPU) 101, a main memory 102, an input device 103, a display device 104, a hard disk drive (HDD) 105, and a CD-ROM/DVD drive 106. The display device 104 includes a display screen 114, and the DVD/CD-ROM drive 106 may include a recording medium (in the present embodiment, a DVD-ROM or a CD-ROM) 121.

The CPU 101 executes a program stored in the HDD 105 or the recording medium 121 and controls a device body. The main memory 102 is a work area of the CPU 101, and information related to texture data edited by a user is temporarily stored in the main memory 102. The HDD 105 is used as a storage area for storing a program or data.

The DVD/CD-ROM drive 106 executes reading of a program and data from the recording medium 121. The input device 103 includes a mouse used as a pointer and a keyboard with a directional key. The keyboard is used to input a text, and a drag or drop operation of the mouse is used to move an object or a pasting image on the display screen 114. Input data from the input device 103 is output to the main memory 102, and the CPU 101 interprets the input data to execute arithmetic processing.

A program and data to be executed in the 3D model display device are stored in the recording medium 121. Data stored in the recording medium 121 includes an avatar which is present in a virtual 3D space, graphic data for configuring a cloth model, a cutting drawing corresponding to the cloth model, and a motion program for having an avatar to execute a predetermined motion. The program and data stored in the recording medium 121 are read by the DVD/CD-ROM drive 106 and loaded into the main memory 102 at the time of execution. The CPU 101 processes the program and data loaded into the main memory 102 and outputs a drawing instruction to the display device 104. Intermediate data generated while the CPU 101 is performing processing is stored in the main memory 102.

The CPU 101 expands image data and displays an image on the display screen 114 of the display device 104. A one frame time of an image output from the CPU 101 is, for example, 1/60 second. The CPU 101 generates image data of a 2D image into which an object (an avatar and a cloth model) which is present in a virtual 3D space is perspectively transformed by a virtual camera and displays the image data of the 2D image on the display screen 114 together with other image data provided by a user's operation. In image processing described above, an image processing controller (including a graphic processing unit (GPU) and a read only memory (ROM)) may be used.

Figure 2:
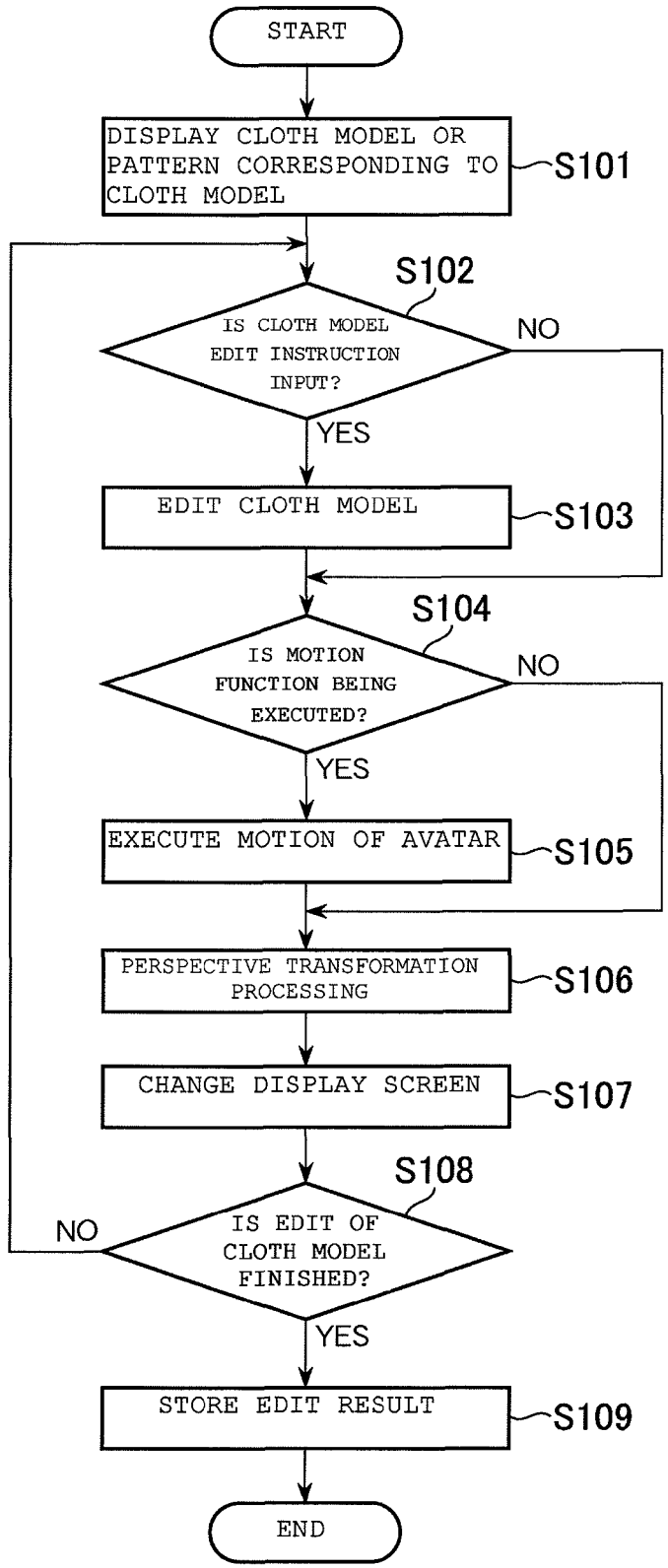
FIG. 2 is a flowchart when edit processing of a cloth to be worn by an avatar is executed.

The 3D model display device according to the present invention supports a user to create a design of an operable character (which is described below as a doll character three-dimensionally expressed) as an avatar in the virtual 3D space. FIG. 2 is a flowchart when edit processing of a cloth worn by an avatar is executed in the 3D model display device of the present invention. A 2D image into which the avatar in the virtual 3D space is perspectively transformed by the virtual camera is displayed on the display screen 114 of the 3D model display device, and a window for executing an edit of a cloth worn by an avatar (a 3D cloth model or a 2D pattern corresponding to the cloth model is displayed in a window) is displayed by a user's operation (step S101). Next, it is determined whether or not a cloth model edit instruction is input from the user (step S102). When the cloth model edit instruction is input (YES in step S102), a cloth model edit is executed (step S103). That is, image pasting, figure drawing, and texture deletion are reflected in the cloth model by the user's operation.

Figure 9:
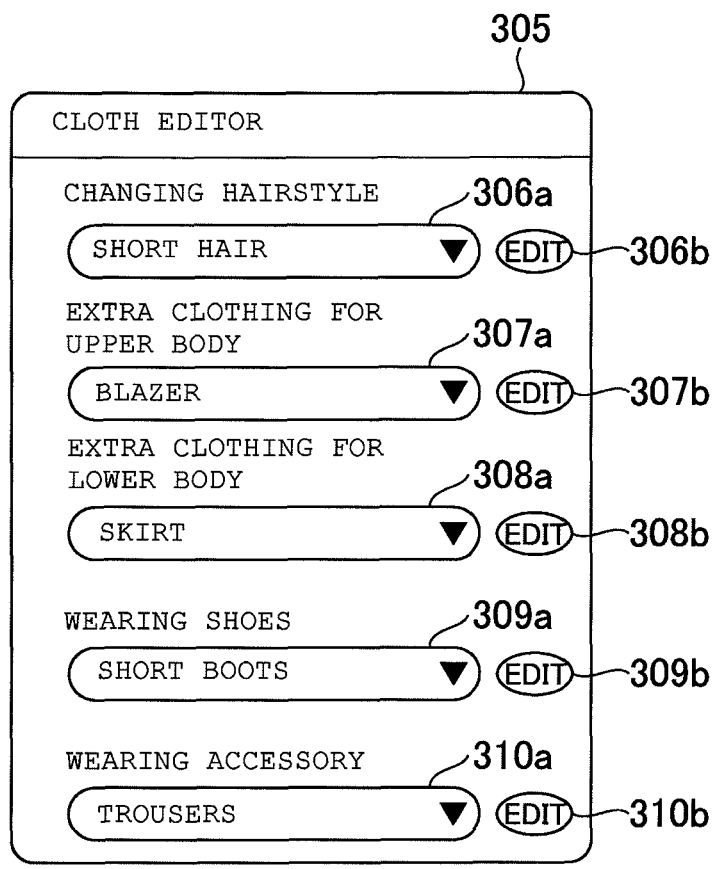
FIG. 9 is a view illustrating an example of a window (a cloth editor) displayed on the display screen 114 to execute an edit of a cloth worn by an avatar.

FIG. 9 is a view illustrating an example of a window (a cloth editor window) displayed on the display screen 114 to execute an edit of a cloth worn by an avatar. When the cloth editor widow 305 is displayed, a texture of a cloth worn by an avatar can be edited. A hairstyle selection box 306a (long hair or short hair can be selected) in which previously registered hairstyles can be selected, an upper body cloth selection box 307a (T-shirts, tank tops, blazers, or magician clothes can be selected) in which an upper body cloth can be selected, a lower body cloth selection box 308a (long skirts or tight skirts can be selected) in which a lower body cloth can be selected, a shoes selection box 309a (sneakers, pumps, short boots, or magician shoes can be selected) in which shoes can be selected, and an accessory selection box 310a (bangles, ribbons, or bracelets can be selected) in which accessories can be selected are disposed in the cloth editor window 305. When the user selects edit buttons 306b, 307b, 308b, 309b, and 310b which relate to a hairstyle, extra clothes for the upper body, extra clothes for the lower body, shoes, accessories, respectively, the avatar's cloth can be edited using a 3D cloth model and a 2D cloth model pattern corresponding to the model based on data selected by the respective selection boxes 306a, 307a, 308a, 309a, and 310a.

Figure 3:
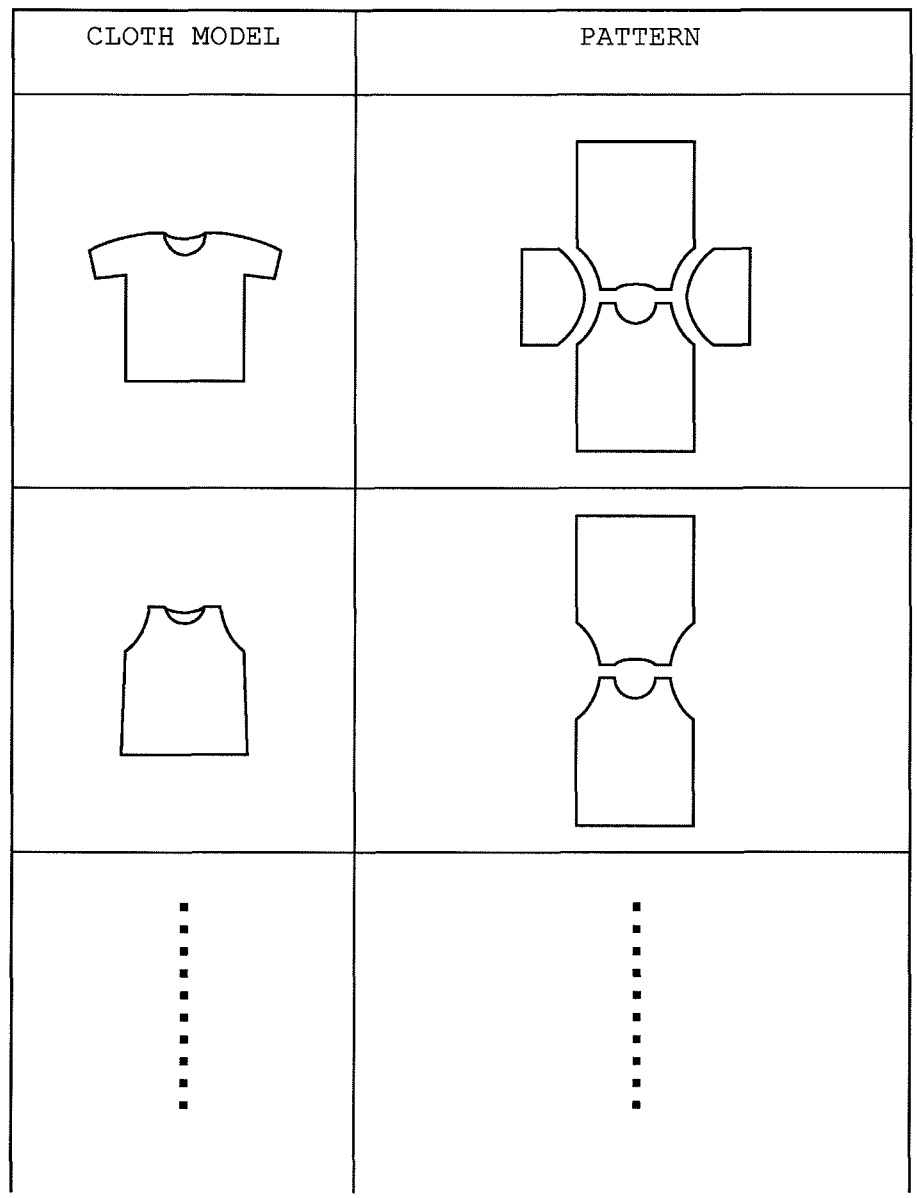
FIG. 3 is a view illustrating a correspondence relationship table of a cloth model 202 and a pattern 203.

As illustrated in FIG. 3, a cutting drawing (hereinafter, simply referred to as a "pattern") of a cloth model in which a cloth model three-dimensionally expressed is expanded to a 2D pattern corresponding thereto is prepared for each cloth model. Each pattern is divided into portions (a sleeve, a body, etc.) of a cloth model which are disposed on a plane within one frame.

Figure 4:
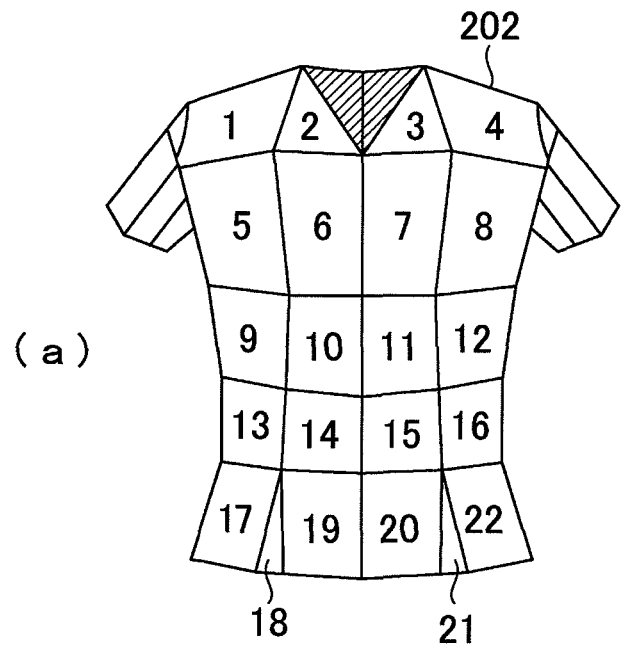
FIGS. 4A and 4B are views illustrating a correspondence relationship between each polygon of the cloth model 202 and the pattern 203.
Figure 4:
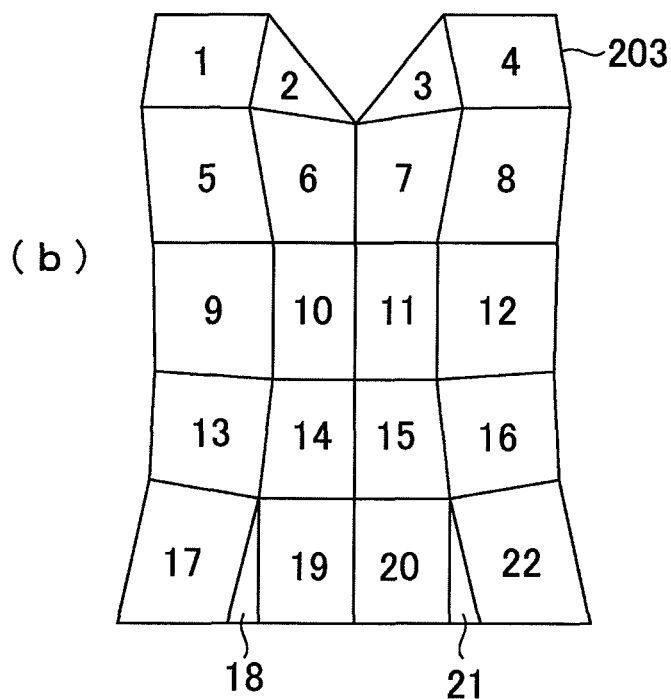

FIG. 4 illustrates a correspondence relationship between polygons of a cloth model 202 and a pattern 203. In particular, FIG. 4 illustrates body front portions of the cloth model 202 and the pattern 203. The cloth model 202 is configured by polygons of a plurality of triangles or quadrangles, and the polygons are combined to each other to represent the 3D cloth model 202. Each polygon labeled with a number on a surface of the cloth model 202 configured by the polygons corresponds to each portion of the pattern 203, which is two-dimensionally expressed, labeled with the same number. Therefore, a result edited in the pattern 203 which is two-dimensionally expressed is reflected in the surface of the cloth model 202 which is three-dimensionally expressed.

Figure 5:
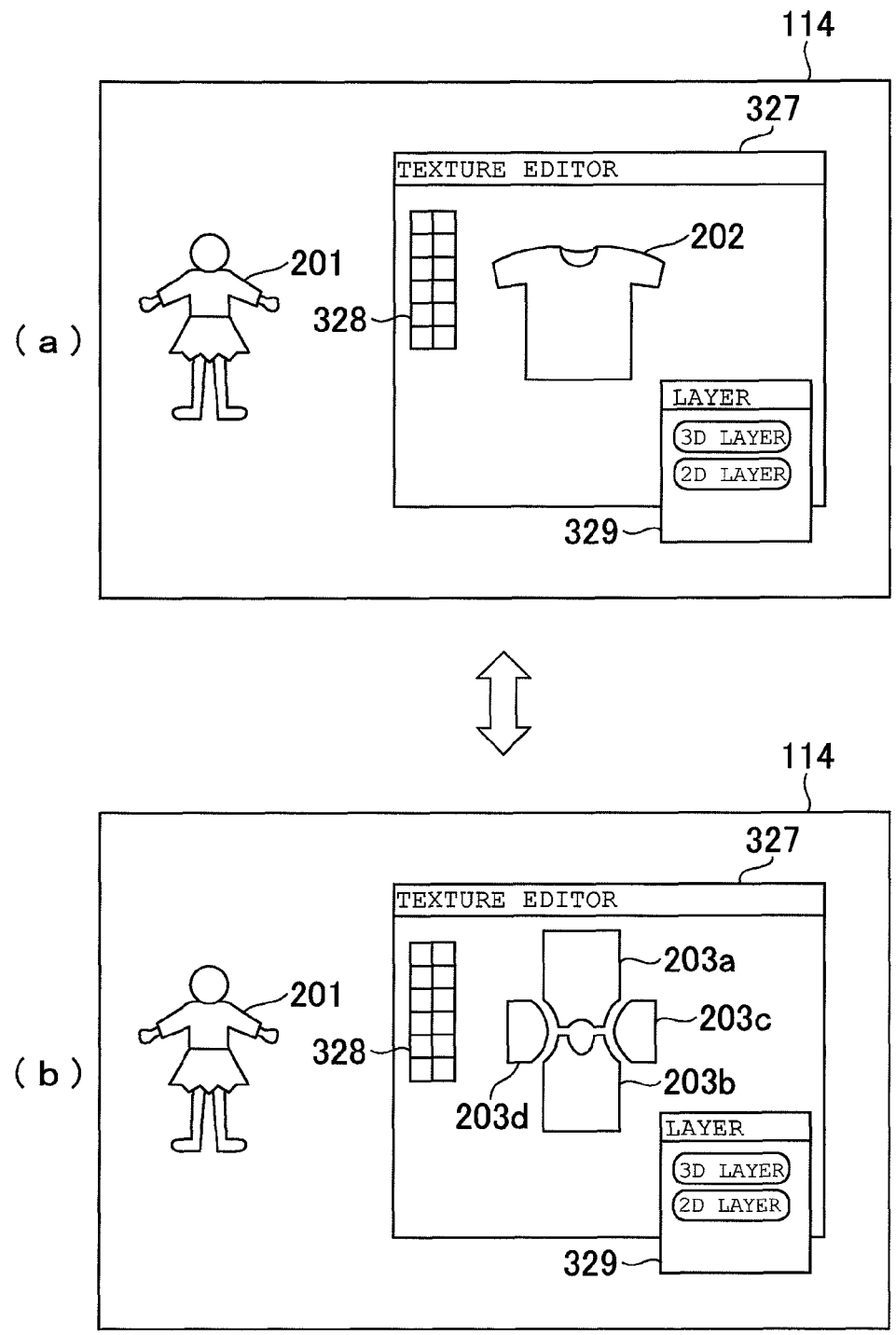
FIGS. 5A and 5B are views illustrating a change of a display screen 114 when switching between a 3D layer and a 2D layer is executed.

FIGS. 5A and 5B are views illustrating a change of the display screen 114 when switching between a 3D layer and a 2D layer is executed. In the present invention, the layers can be switched during an edit based on a correspondence relationship between the 3D layer and the 2D layer. In FIG. 5A, a texture editor window 327 in which an edit of an avatar 201 and a cloth is performed and a layer window 329 are displayed on the display screen 114. The cloth model 202 and a tool window 328 are displayed in the texture editor window 327. The user performs an edit of the cloth model 202 using the tool window 328. A pen tool (a pen drawing tool), an eraser tool (a tool for erasing an object drawn on a layer and making it transparent), a painting tool (a tool for painting a layer), a stamp tool (a tool for drawing while copying an image of a certain image to a mouse click/drag location) are disposed in the tool window 328, and a texture edit can be performed using the tools. A size of a pen nib at the time of using the pen tool or the eraser tool can be adjusted.

Besides, an image pasting tool (a tool for pasting an image preferred by the user to the pattern 203), a pattern paper moving tool (a tool for moving the pattern 203 in the 2D layer), a pattern paper rotating tool (a tool for rotating the pattern 203 in the 2D layer) are disposed. Since the pattern paper moving tool and the pattern paper rotating tool are used to past an image to the pattern 203, an image can be pasted so that a joint of an expansion view can be natural, or a design preferred by the user can be employed for each portion from a design of a pasting image. The pattern 203 which is rearranged can be stored as data just like data of a cloth edited by the user is stored. In this case, the image which the user prefers and selects is displayed to be superimposed on the pattern 203 in the texture editor window 327, and thus the user can select where to paste the image.

Since the user can paste a plurality of pasting images to the pattern 203 and paste any image to each portion, the user's own cloth model 202 in which respective portions of the cloth model 202 have different designs or colors desired by the user can be easily made. The pasting images may be pasted to be superimposed on each other by making some of the pasting images transparent or changing transmittance of some of the pasting images. In such an edit, the pasting image itself can be edited, for example, a read pasting image may be scaled up or down, transformed, or changed in color. Further, an edit state during as well as before and after the edit may be displayed to be reflected in the cloth model 202.

As the pasting image, in addition to a still image previously stored in the HDD 105, a still image of a desired scene may be captured from a moving image shot by a digital camera, read into a 3D designer and used by an operation of a user. As described above, since the pasting image can be acquired from the outside of the 3D designer, the user's freedom degree in a cloth design edit is further increased, and the user can make a more distinct cloth.

When a camera which shoots a moving image is connected to the 3D model display device, a still image of a desired scene may be captured from a moving image being shot by the camera in real time. Further, a still camera may be connected to the 3D model display device, and an image shot by the still camera may be stored in the HDD 105 to be used as the pasting image. Therefore, even when a large number of images are not prepared, an image desired by the user may be shot and used in executing a 3D design such as an avatar's cloth.

Selection buttons 329a and 329b through which the user selects one of the 3D layer and the 2D layer used to perform an edit are disposed in the layer window 329. When the user selects the selection button 329b for switching to the 2D layer, the texture editor window 327 on the display screen 114 is switched to an edit screen of the 2D layer as illustrated in FIG. 5B. Patterns 203a, 203b, 203c, and 203d corresponding to the cloth model 202 are displayed in the texture editor window 327. The patterns 203a, 203b, 203c, and 203d can be edited by using the tool window 328. When the user selects the selection button 329a of the layer window 329, the texture editor window 327 in the display screen 114 is switched to an edit screen of the 3D layer as illustrated in FIG. 5A.

Display magnification of the cloth model 202 displayed in the texture editor window 327 may be changed. Display magnification may be increased to edit details of the cloth model 202, and display magnification may be reduced to edit while looking down an overall cloth model.

Mapping of the surface of the cloth model 202 is performed by bump mapping. Bump mapping refers to a mapping technique of displacing a normal line of each pixel of a texture mapped on polygons of an object and expressing similar concavity and convexity on a surface of the object. That is, since a normal line of each pixel is displaced and so reflected light from a light source in the virtual 3D space is displaced, in an image in which it is perspectively transformed, shading of the object surface is changed to express apparent concavity and convexity. Concavity and convexity of creases of a cloth formed by an avatar's motion are expressed by bump mapping in conjunction with a change of polygons of the cloth model according to the motion. As will be described later, it is possible to have the avatar 201 to execute a predetermined motion, the cloth model is transformed by the motion, and shapes of the polygons of the cloth model are transformed together with the cloth model. Due to bump-mapping described above, movement such as creases or shimmers is expressed in a cloth worn by the avatar 201.

When the edit of the cloth model is performed in step S103 or when it is determined in step S102 that the edit instruction of the cloth model is not input, it is determined whether or not a motion function is being executed (step S104). When it is determined that the motion function is being executed (YES in step S104), a motion execution of the avatar 201 is performed (step S105). In the motion execution of the avatar 201, a motion is determined according to a predetermined algorithm which is previously prepared, and the user may select a motion to be executed. For example, the user may select, for example, "walking", "running", "dancing", and "throwing". Since the motion of the avatar 201 can be selected, it can be easily confirmed how the edited avatar 201 is expressed for a certain motion.

Figure 11:
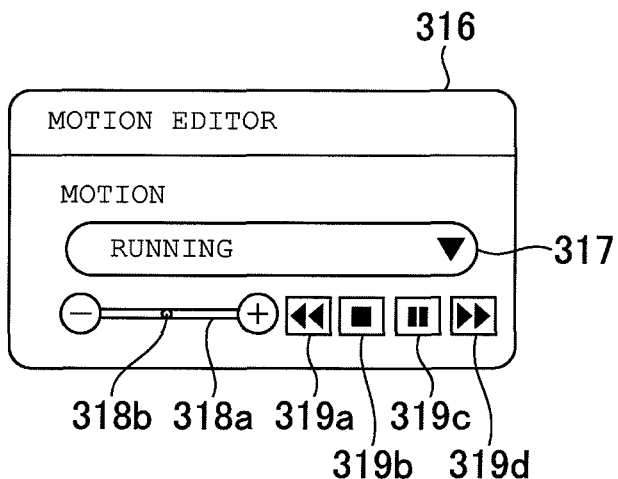
FIG. 11 is a view illustrating an example of a window (a motion editor) displayed on the display screen 114 to execute an edit of a motion of the avatar.

FIG. 11 is a view illustrating an example of a window (a motion editor) displayed on the display screen 114 to execute an edit of a motion of the avatar 201. When an edit of a motion of the avatar 201 is executed, a motion editor window 316 for executing a motion edit is displayed on the display screen 114. A motion selection box 317 is disposed at a central portion of the motion editor window 316. When the user selects the motion selection box 317, a list of motions which are previously registered is displayed, and so the user can select a motion which the avatar 201 is to execute. For example, "walking", "running", "dancing", and "throwing" can be selected. A motion speed adjusting slider 318a for adjusting a moving speed of the avatar 201 is disposed below the motion selection box 317. When a pointer 318b displayed in the motion speed adjusting slider 318a is moved right, the motion speed of the avatar 201 is increased, while when the pointer 318b is moved left, the motion speed of the avatar 201 is reduced. Motion operation buttons 319a, 319b, 319c, and 319d are disposed on the right side of the motion speed adjusting slider 318a. When the motion operation button 319a or 319d is selected by the user's operation, among motions which can be selected in the motion selection box 317, a motion registered before or after a motion which the avatar 201 is currently executing is executed. When the motion operation button 319b is selected, the motion of the avatar 201 is stopped, and when the motion operation button 319c is selected, the motion of the avatar 201 is paused. Since the motion of the avatar 201 can be paused, it can be easily confirmed how the edited avatar 201 is displayed at a certain moment of a certain motion.

When the motion of the avatar 201 is executed in step S105 or when it is determined in step S104 that the motion function is not being executed, perspective transformation processing is performed by a virtual camera (step S106). A content displayed on the display screen is changed based on the processing result (step S107).

A position of the virtual camera may be changed by the user's operation. Therefore, an edit may be performed by disposing the virtual camera at a position closer to the avatar 201, and an edit may be performed while looking down the whole avatar 201. Further, a position of the virtual camera may be changed using the avatar 201 as a reference point. The avatar 201 may be observed from various observing points such as an observing point of looking down at the avatar 201, an observing point of looking up at the avatar 201, an observing point of looking at the avatar 201 from the side other than the front, and an observing point of looking at the avatar 201 from the back. Therefore, it can be confirmed how the edited avatar 201 is displayed in a certain direction or from a certain location. A location of a light source in the virtual 3D space may be fixed or changed so that the user can have visual contact with a shadow of a cloth worn by the avatar 201 and a shadow of the avatar 201 including the cloth, which are expressed by the light source, through the display screen 114. The light source is, for example, the sun or lighting used to more realistically express a shared virtual space within the space. When a shadow is recreated in the shared virtual space at the time of a cloth design edit as described above, the user can easily imagine how the avatar 201 wearing a cloth made by the user is seen in the shared virtual space, and thus the time and efforts of a trial in the shared virtual space can be saved.

Processing of from step S102 to step S107 is performed for each frame and continued until the user finishes an edit of the cloth model. That is, when a content of the display screen is changed in step S107, it is determined whether or not an input for finishing an edit of the cloth model is performed by an input from the user (step S108). When it is determined that the input for finishing an edit of the cloth model is not performed (NO in step S108), processing of from step S102 to step S107 is continuously performed. On the other hand, when the input for finishing an edit of the cloth model is performed (YES in step S108), the edit result is stored in the main memory 102 (step S109).

Figure 6:
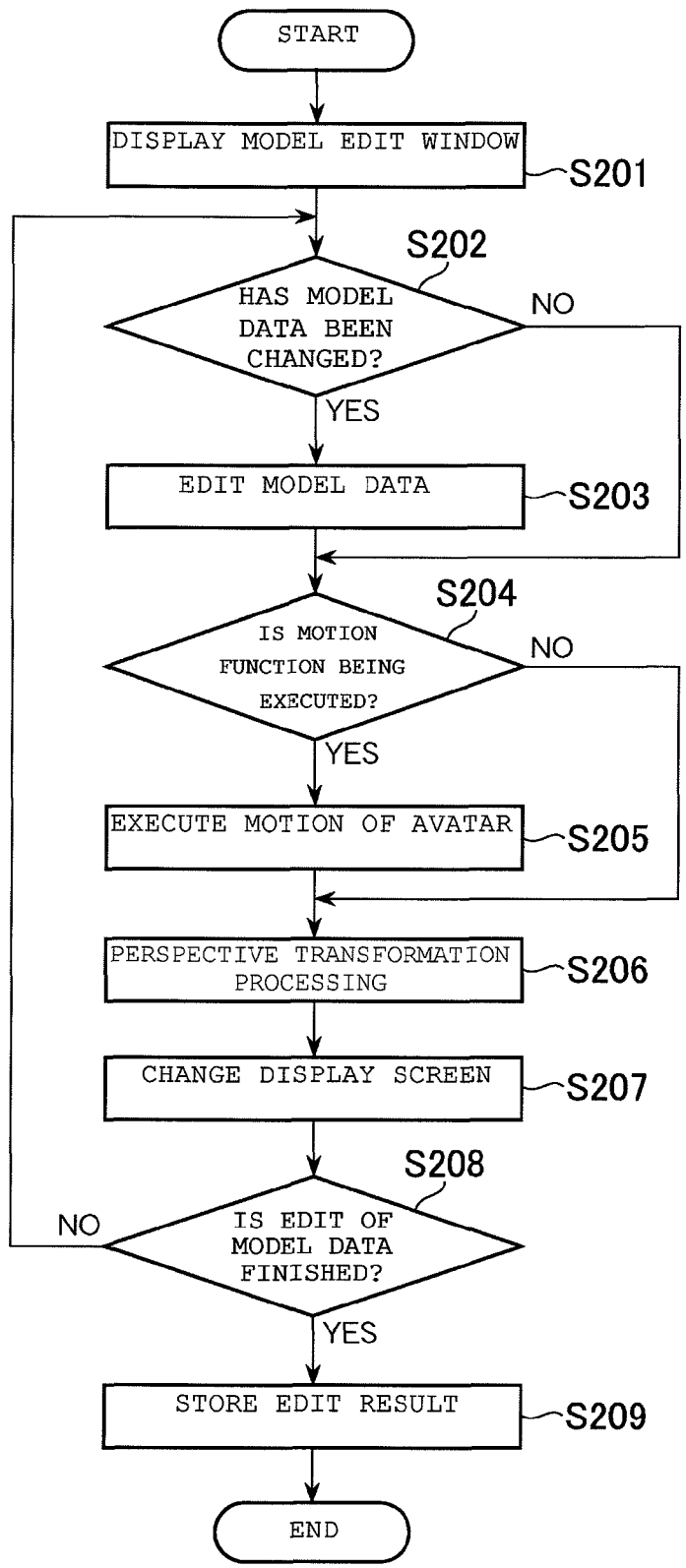
FIG. 6 is a flowchart when model data change processing is performed.

FIG. 6 is a flowchart when model data change processing is performed. First, a model edit window is displayed (step S201). Next, it is determined whether or not model data has been changed by the user's operation (step S202). When model data has been changed (YES in step S202), an edit of model data (an edit of a head-sized body, a head size, and a bust size) is executed (step S203).

Figure 10:
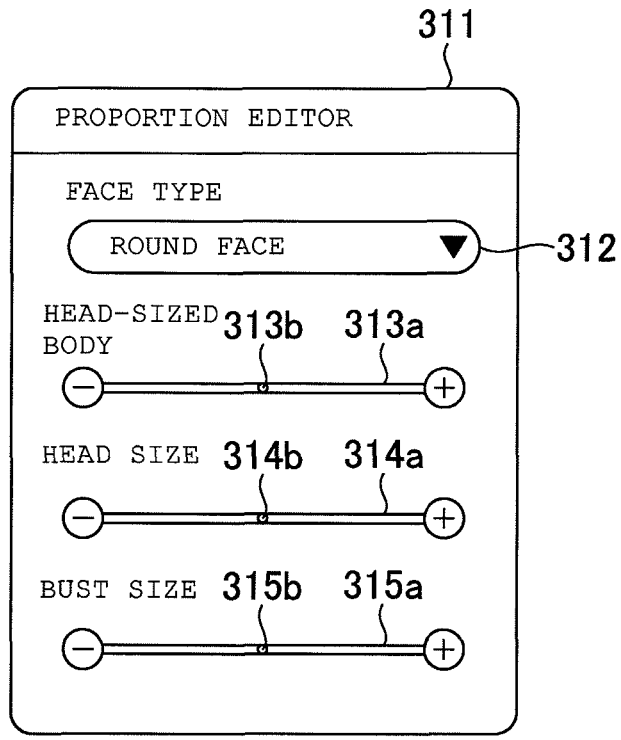
FIG. 10 is a view illustrating an example of a window (a proportion editor) displayed on the display screen 114 to execute an edit of model data.

FIG. 10 is a view illustrating an example of a window (a proportion editor) displayed on the display screen 114 to execute an edit of model data. When an edit of model data is executed, a proportion editor window 311 for executing an edit of model data is displayed on the display screen 114. A face type selection box 312 for selecting a face type of the avatar 201 is disposed in an upper portion of the proportion editor window 311, and the user may select a face type used for an edit among from face types which are previously registered. For example, a face type such as a round face and a long, oval face can be selected. A head-sized body adjusting slider 313a for adjusting a head-sized body of the avatar 201, a head size adjusting slider 314a for adjusting a head size of the avatar 201, and a bust size adjusting slider 315a for adjusting a bust size of the avatar 201 are disposed below the face type selection box 312. A pointer 313b, a pointer 314b, and a pointer 315b, respectively, displayed at central portions of the head-sized body adjusting slider 313a, the head size adjusting slider 314a, and the bust size adjusting slider 315a may be moved left or right to adjust the head-sized body, the head size, and the bust size, respectively.

Figure 7:
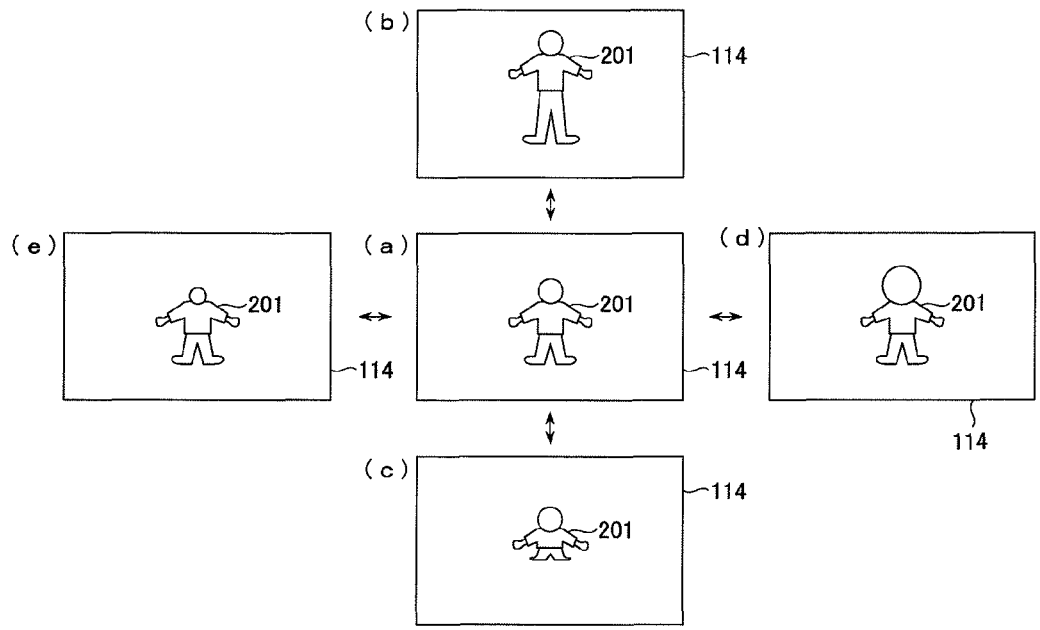
FIG. 7 is a view illustrating a change of an avatar on the display screen 114 before and after an edit of model data.

FIG. 7 is a view illustrating a change of the avatar 201 on the display screen 114 before and after an edit of model data. The avatar 201 which is present in the virtual 3D space is displayed on the display screen 114 as a 2D image. For example, let us use FIG. 7A as a reference. The avatar 201 displayed on the display screen 114 of FIG. 7A is a 3 head-sized body. When the pointer 313b in the head-sized body adjusting slider 313a is moved right, a ratio of the whole body to the head in the avatar 201 is further increased like the avatar 201 (about 5 head-sized body) displayed on the display screen 114 of FIG. 7B. In this case, the head size is not changed, and a size of a portion (a body portion) below a head is increased to thereby increase a ratio of the whole body to the head. On the other hand, when the pointer 313b in the head-sized body adjusting slider 313a is moved left, a ratio of the whole body to the head in the avatar 201 is further decreased like the avatar 201 (about 2 head-sized body) displayed on the display screen 114 of FIG. 7C. In this case, the head size is not changed, and the size of the body portion is decreased to thereby decrease a ratio of the whole body to the head. A ratio of the whole body to the head in the avatar 201 may be adjusted between 2 to 8 head-sized bodies by the head-sized body adjusting slider 313a.

In order to change a size of the body portion of the avatar 201, it is necessary to change a size of a virtual skeleton set to the avatar 201, that is, a joint distance of a virtual skeleton. Further, a joint distance of a direction perpendicular to a height as well as a height direction may be changed at a predetermined ratio. Skinning is performed based on the changed virtual skeleton, so that skin which configures the upper body and the lower body of the avatar 201 is formed along the virtual skeleton. Even when a size of the body portion of the avatar 201 is changed, the virtual skeleton of the head is not changed, and a location relationship between the head and the body portion is maintained. Therefore, the avatar 201 in which the size of the body portion is changed can be obtained.

In the case of changing a size of the body portion using the head-sized body adjusting slider 313a, a size of a cloth which the avatar 201 wears on its body portion also needs to be changed and displayed on the display screen 114 according to a size change of the body portion of the avatar 201. That is, sizes of polygons which configure the cloth model 202 worn by the avatar 201 are changed according to a change ratio of the body portion of the avatar 201, and thus the cloth model 202 can be displayed while maintaining a location relationship and a large-small relationship of the avatar 201 even though the body portion of the avatar 201 becomes larger.

When the pointer 314b in the head adjusting slider 314a is moved right, the head size of the avatar 201 displayed on the display screen 114 of FIG. 7A becomes larger like the avatar 201 displayed on the display screen 114 of FIG. 7D (in FIG. 7A, a head width of the avatar 201 of a 2D image is slightly shorter than the waistline, but in FIG. 7D, a head width is almost equal to the waistline). In this case, a size of the body portion is not changed, but a size of the head is increased. When the pointer 314b in the head adjusting slider 314a is moved left, the head size of the avatar 201 displayed on the display screen 114 of FIG. 7A is decreased like the avatar 201 displayed on the display screen 114 of FIG. 7E (in FIG. 7A, a head width of the avatar 201 of a 2D image is slightly shorter than the waistline, but in FIG. 7E, a head width is almost half of the waistline). In this case, a size of the body portion is not changed, but the head size is decreased. Even when the head size of the avatar 201 is changed, the virtual skeleton of the body portion is not changed, and a location relationship between the head and the body portion is maintained. Therefore, the avatar 201 in which the head size is changed can be obtained.

The bust size is changed by transforming bones which configure the avatar 201. When the avatar 201 is a female character, the bust size may be changed, but in the case of a male character, a bust size may not be changed. In the case of changing the bust size, the bust size is changed by transforming the virtual skeleton of the bust portion of the virtual skeleton which configures the 3D model. In the case of increasing the bust size, a location of the bust portion of the virtual skeleton is changed in a direction further away from a body center, and skinning is performed based on the changed virtual skeleton, so that skin which configures the bust portion is formed along the virtual skeleton. Therefore, the 3D model in which the bust size is large can be obtained.

When an edit of model data is performed in step S203 as described above or when it is determined in step S202 that model data has not been changed, it is determined whether or not a motion function is being performed (step S204). When it is determined that the motion function is being performed (YES in step S204), a motion execution of the avatar 201 is performed (step S205). For the motion execution of the avatar 201, a motion is determined according to a predetermined algorithm which is previously prepared, and the user can select a motion to be executed. For example, the user can select "walking", "running", "dancing", and "throwing". The motion editor window 316 described above is used to edit the motion of the avatar 201.

Since a motion program is one which defines a movement locus of the 3D model having a predetermined size and joint distance, in the case of editing a proportion of the avatar 201, a definition target is lost, and thus a motion program typically needs to be reconstructed. In a motion program according to an embodiment of the present invention, an angle (for example, an angle of a shoulder portion formed by three joint points of an elbow, a shoulder, and a neck portion) formed by respective joint points of the virtual skeleton of the avatar 201 before and after the motion and an angle speed when a motion is executed at the angle are previously determined, and the avatar 201 is required to execute a predetermined motion according to the angle and the angle speed. Therefore, even though the proportion of the avatar 201 is changed, the motion program does not need to be reconstructed.

When the motion of the avatar 201 is executed in step S205 or when it is determined in step S204 that the motion function is not being executed, perspective transformation processing is performed by the virtual camera (step S206). A content displayed on the display screen is changed based on the processing result (step S207). As described above, a position of the virtual camera may be changed by the user's operation, and it can be confirmed how the edited avatar 201 is displayed in a certain direction or from a certain position. A location of a light source in the virtual 3D space may be fixed or changed so that the user can have visual contact with a shadow of a cloth worn by the avatar 201 and a shadow of the avatar 201 including the cloth, which are expressed by the light source, through the display screen 114.

Processing of from step S202 to step S207 is performed for each frame and continued until the user finishes an edit of model data. That is, when a content of the display screen is changed in step S207, it is determined whether or not an input for finishing an edit of model data is performed by an input from the user (step S208). When it is determined that the input for finishing an edit of model data is not performed (NO in step S208), processing of from step S202 to step S207 is continuously performed. On the other hand, when the input for finishing an edit of model data is performed (YES in step S208), the edit result is stored in the main memory 102 (step S209).

Figure 8:
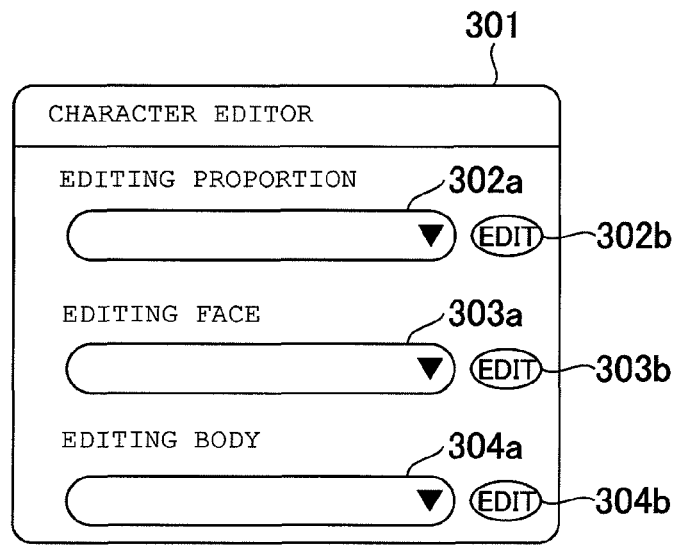
FIG. 8 is a view illustrating an example of a window (a character editor) displayed on the display screen 114 to execute an edit of the avatar.

FIG. 8 is a view illustrating an example of a window (a character editor) displayed on the display screen 114 to execute an edit of the avatar 201. When a character edit of the avatar 201 is executed, a character editor window 301 for executing a character edit is displayed on the display screen 114.

A proportion selection box 302a and a proportion edit button 302b are disposed in an upper portion of the character editor window 301. When the user selects the proportion selection box 302a, a list of previously registered proportion data (proportion data of a 4 head-sized body or proportion data of an 8 head-sized body) is displayed, and the user can select proportion data used to execute an edit of the avatar 201. When the user selects the proportion edit button 302b, a proportion editor of FIG. 10 is displayed, and a proportion edit of the avatar 201 may be executed based on proportion data selected in the proportion selection box 302a.

A face selection box 303a and a face edit button 303b are disposed below the proportion selection box 302a and the proportion edit button 302b. When the user selects the face selection box 303a, a list of previously registered face data (for example, a gentle face, a face of a girls' comics style, and a confident face) is displayed, and the user can select a face used to execute an edit of the avatar 201. When the user selects the face edit button 302b, a face of the avatar 201 may be edited using a 3D face model and a 2D face pattern corresponding to the face model based on face data selected in the face selection box 303a. A face edit using the face model and the face pattern is executed in a similar manner to the above-described cloth model edit using the cloth model and the pattern corresponding to the cloth model. When the user selects the face edit button 302b, the face editor window 320 of FIG. 12 may be displayed so that a face edit of the avatar 201 can be executed.

A body selection box 304a and a body edit button 304b are disposed in a lower portion of the character editor window 301. When the user selects the body selection box 304a, a list of previously registered body data (for fighters or for waitresses) is displayed, and the user can select a body used to execute an edit of the avatar 201. Body data refers to one which decorates a layer which is closer to a skin portion of the avatar 201 than extra clothes for the upper body, extra clothes for the lower body, and accessories described above (corresponds to underwear or stockings which closely contact with skin of the avatar 201). When the user selects the body edit button 304b, the body of the avatar 201 may be edited using a 3D body model and a 2D body pattern corresponding to the body model based on body data selected in the body selection box 304a. A body edit using the body model and the body pattern is executed in a similar manner to the above-described cloth model edit using the cloth model and the pattern corresponding to the cloth model.

Figure 12:
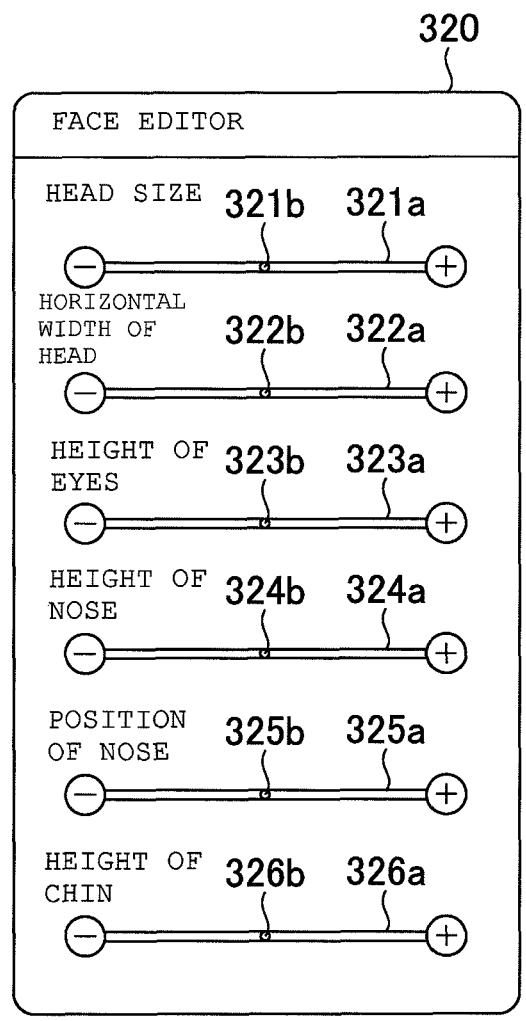
FIG. 12 is a view illustrating an example of a window (a face editor) displayed on the display screen 114 to execute an edit of a face of the avatar.

In the present invention, it is possible to adjust and edit a ratio of each portion of the face of the avatar 201 as well as the head-sized body, the head, and the bust of the avatar 201. FIG. 12 is a view illustrating an example of a window (a face editor window) displayed on the display screen 114 to execute an edit of the face of the avatar 201. A head size adjusting slider 321a, a head horizontal width adjusting slider 322a, an eye height adjusting slider 323a, a nose height adjusting slider 324a, a nose location adjusting slider 325a, and a chin height adjusting slider 326a are disposed in the face editor window 320. Respective pointers 321b, 322b, 323b, 324b, 325b, and 326b displayed in the sliders may be moved left or right to edit the face of the avatar 201. In this case, when the pointers of the respective sliders are moved, the virtual skeleton formed in the avatar 201 is transformed, so that the face of the avatar 201 is changed. For example, when the pointer 324b of the nose height adjusting slider 324a is moved right, a height of the nose portion of the virtual skeleton is increased. Skinning is performed based on the changed virtual skeleton, so that skin which configures the face of the avatar 201 is formed along the virtual skeleton. Therefore, the avatar 201 having a high nose can be obtained.

Figure 13:
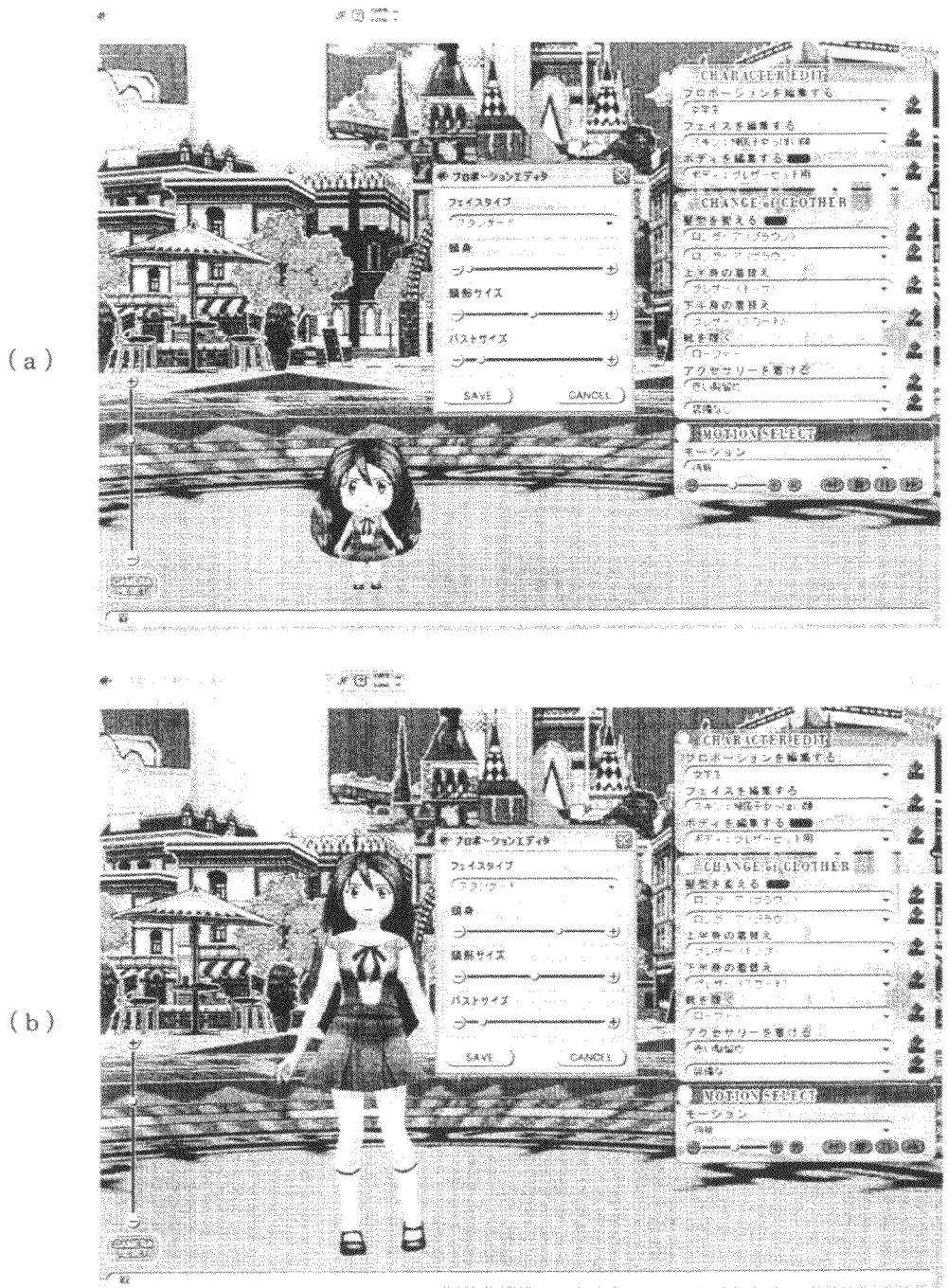
FIGS. 13A and 13B illustrate an example of the display screen when a character is edited by the proportion editor.

FIGS. 13A and 13B illustrate an example of the display screen when a character is edited through the proportion editor. In both FIGS. 13A and 13B, displayed is the 2D image in the virtual 3D space in which the virtual camera present in the virtual 3D space is used as an observing point. A window related to the proportion editor is displayed at a central portion of the display screen. The 3D model disposed in the virtual 3D space is displayed at the lower-left side of the window, and a background such as a building in the virtual 3D space is displayed around the 3D model. The 3D model is an edit target. A box for selecting a face type (for example, a standard face, a round face, and a long, oval face) and sliders for adjusting the head-sized body, the head size, and the bust size, respectively, are displayed in the proportion editor. The sliders may be moved left or right by an input of the user to the input device. When the pointers are moved, model data of the 3D model are calculated according to a position of the pointer and reflected in the proportion of the 3D model on the display screen in real time. For example, when the head-sized body adjusting slider is moved right, the head size of the 3D model is maintained, and the body portion below the head is enlarged. When the body portion is enlarged, a location of the head connected to the body portion is surely changed. That is, as the head-sized body adjusting slider is moved further right, location coordinates of the head change upwards according to the enlargement of the body portion while maintaining connection with a portion corresponding to the neck of the body (while maintaining a correspondence relationship between the body portion and the head). In FIG. 13A, since the pointer of the head-sized body adjusting slider is located at the most left side, the displayed 3D model is almost a 2 head-sized body, while, in FIG. 13B, since the pointer of the head-sized body adjusting slider is located at the right from the center, the 3D model is a 5 to 6 head-sized body. When the 3D model has a long hairstyle, even though a location of the pointer of the head-sized body adjusting slider is changed, model data of the hair portion around the head is not particularly changed. However, model data of the hair portion below the head may be changed so that a length of the hair can be increased according to an enlargement of the body. When the pointer of the head size adjusting slider of the proportion editor is moved right, a size of the body portion is maintained, and the head is enlarged. When the pointer of the bust size adjusting slider related to the bust size is moved right, sizes of the head and the body portion (excluding the bust portion) are maintained, and a size of the bust portion is enlarged.

Figure 14:
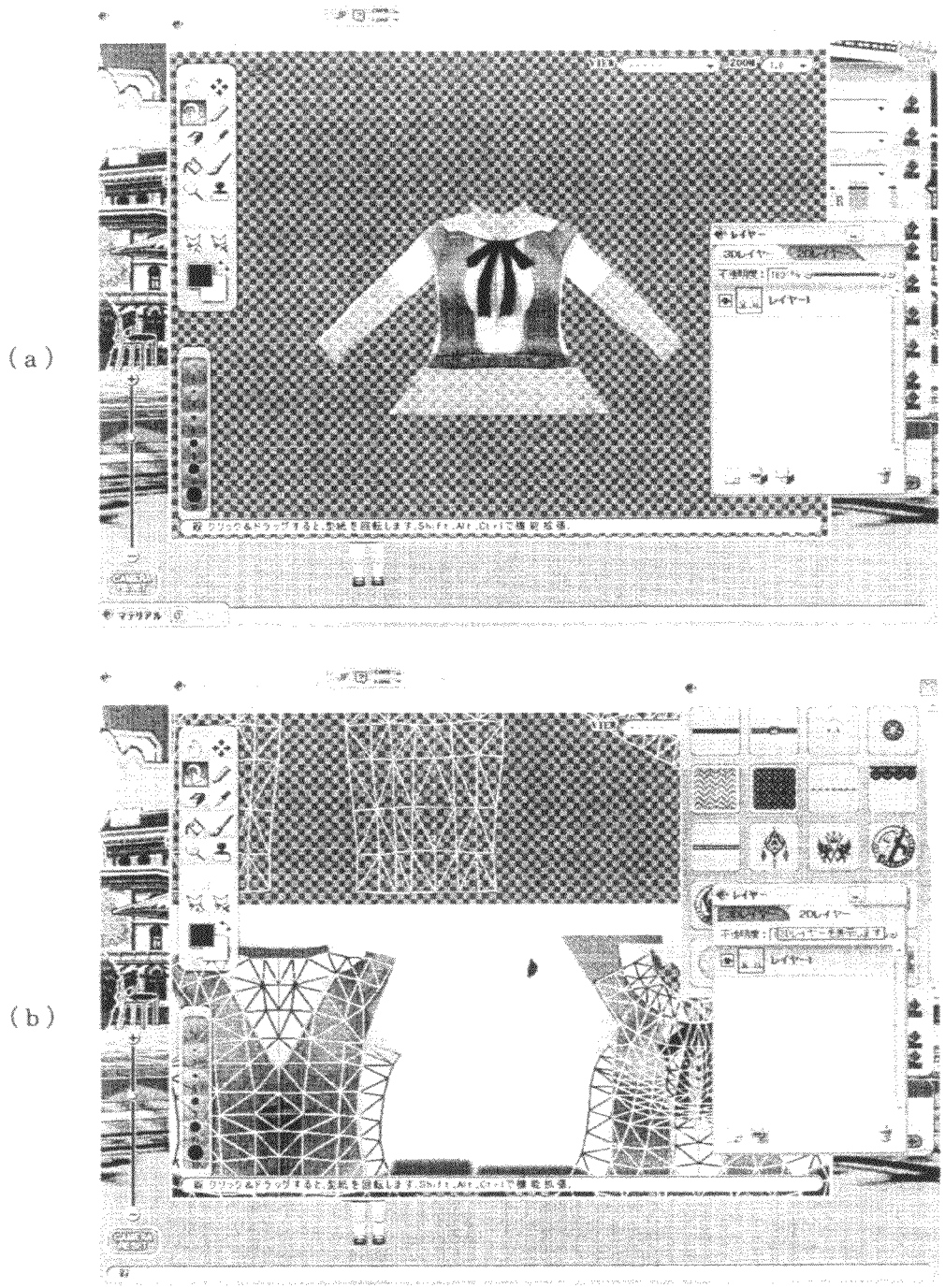
FIGS. 14A and 14B illustrate an example of the display screen when a texture is edited using a 2D layer and a 3D layer.

FIGS. 14A and 14B illustrate an example of the display screen when the texture is edited using the 2D layer and the 3D layer. In FIG. 14A, the texture is edited using the 3D layer, while, in FIG. 14B, the texture is edited using the 2D layer. In both FIGS. 14A and 14B, the texture editor window related to the texture editor for editing the texture is displayed at an almost central portion of the display screen, and the layer window related to the layer is displayed on the right side of the display screen. Tags for selecting one of the 3D layer and the 2D layer used to execute an edit are disposed in the layer window. When the user selects the tags, switching about which of the 3D layer and the 2D layer is to be used to edit the texture is performed. Even though an edit is executed using the 3D layer and an edit is switched to the 2D layer in the middle of editing the texture, the edit result in the 3D layer is reflected in an edit screen (the texture editor window) using the 2D layer. Since the 3D layer and the 2D layer are switched depending on an edit content, even the beginner can perform an advanced edit.

In FIGS. 14A and 14B, similarly to FIGS. 13A and 13B, the 2D image in the virtual 3D space in which the virtual camera present in the virtual 3D space is used as an observing point is displayed (most of it is hidden by the texture editor window and not displayed on the display screen). The user may move, enlarge or reduce the texture editor window through the input device and display the 3D model in the virtual 3D space on the display screen according to a location and a size of the texture editor window. Even though an edit of the texture is executed using any of the 3D layer and the 2D layer, the texture edit result is reflected in a cloth and an accessory worn by the 3D model in real time, and thus the user can execute the edit job while confirming how the 3D model is displayed after an edit.

Figure 15:
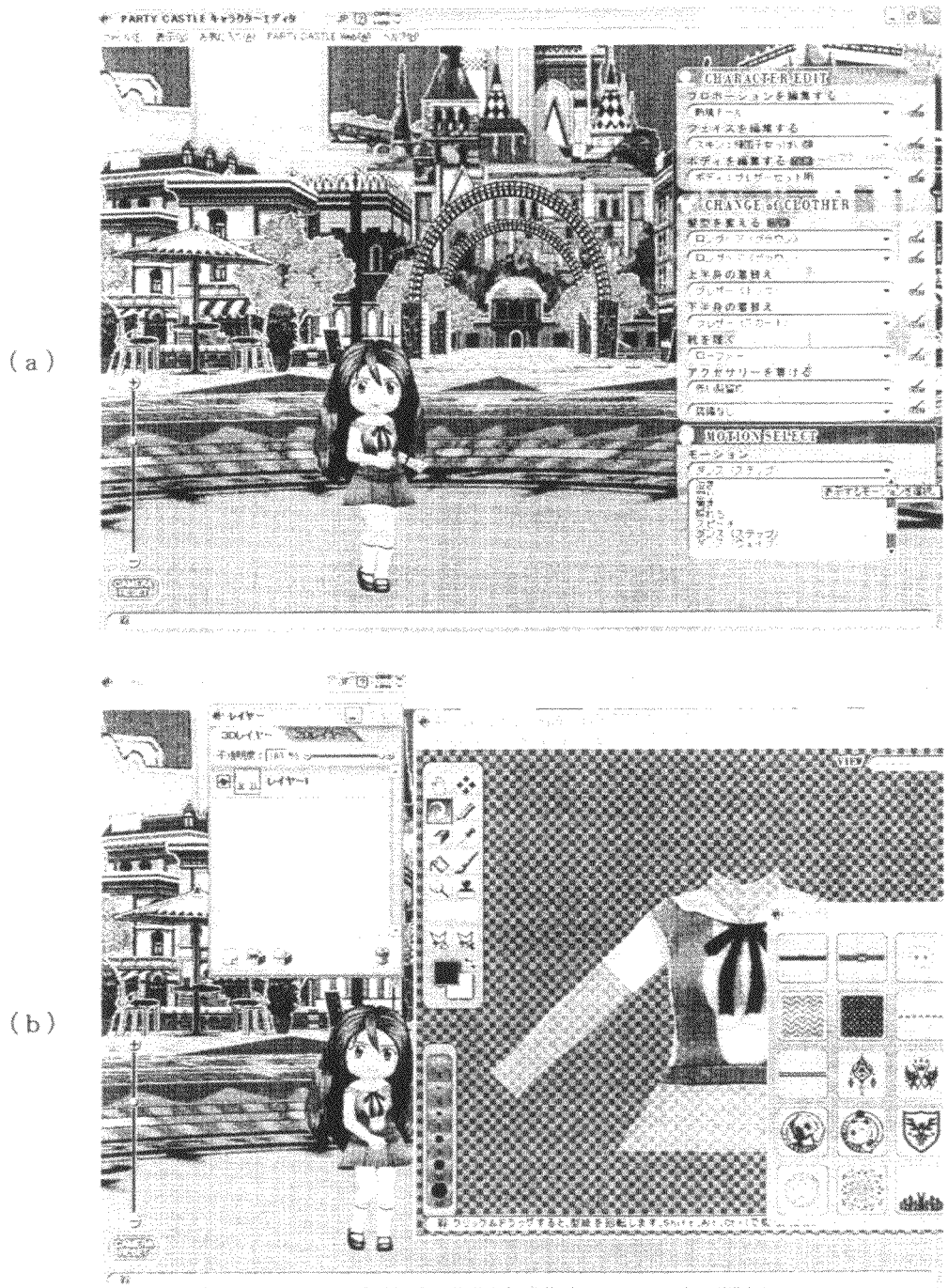
FIGS. 15A and 15B illustrate an example of the display screen when a texture is edited while having a character to execute a predetermined motion.

FIGS. 15A and 15B illustrate an example of the display screen when the texture is edited while having a character to execute a predetermined motion. In FIGS. 15A and 15B, similarly to FIGS. 13A, 13B, 14A, and 14B, the 2D image in the virtual 3D space is displayed. A plurality of windows for editing the 3D model is displayed on the right side of FIG. 15A, and the motion editor window for selecting a motion of the 3D model is displayed on the lowest portion. A box for selecting a plurality of motions is disposed in the motion editor window, and a motion such as, for example, "walking", "running", "throwing", and "dancing" can be executed by the 3D model according to a motion program. In FIG. 15B, an edit of a cloth worn by the 3D model is being executed in the texture editor window while having the 3D model to execute a predetermined motion. Since a texture edit by the texture editor window is reflected in a cloth and an accessory worn by the 3D model in real time, the user can perform an edit job while confirming how a change of the texture is displayed when the 3D model is executing a predetermined motion. In FIG. 15B, the texture edit is executed using the 3D layer. However, the texture edit can be executed using the 2D layer while having the 3D model to execute a predetermined motion, and the edit using the 2D layer is reflected in the 3D model in real time. The head-sized body, the head size, and the bust size may be adjusted, respectively, through the sliders of the proportion editor while having the 3D model to execute a predetermined motion, and the edit by the proportion editor is reflected in the 3D model in real time.

In the embodiment described above, the case of editing a doll character has been described, but the 3D model display device of the present invention can also be applied to an animal character. That is, an edit can be executed while having an animal character to execute a predetermined motion, and sizes of respective portions such as the head and the other portions may be adjusted.

In the embodiment described above, a program and data of the 3D model display device are stored in the recording medium 121 and distributed. When the 3D model display device has a communication interface which is connected to and performs communication with a server device present on an external network, the program and data may be stored in a fixed disk device of the server device and distributed to the 3D model display device via the network. In the 3D model display device, the program and data received through the communication interface from the server device may be stored in the HDD 105 and loaded into the main memory 102 at the time of execution.

Figure 16:
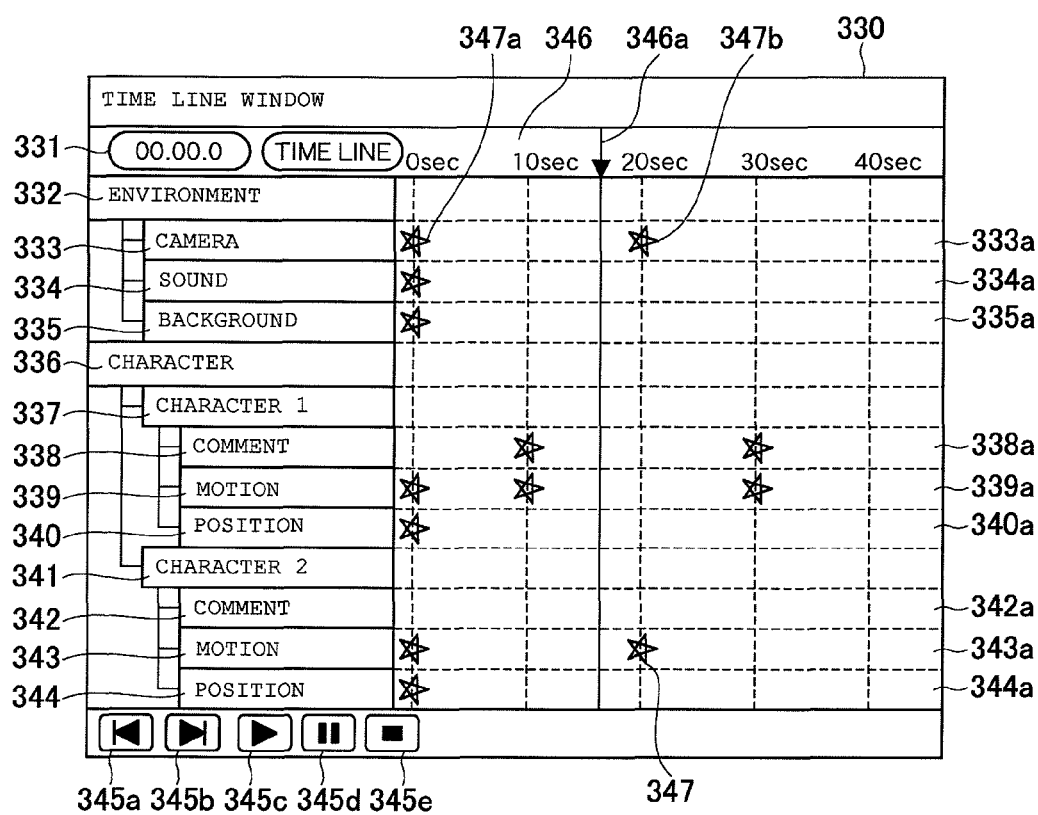
FIG. 16 is a view illustrating an example of a window (a time line window) displayed on the display screen 114 to execute creation of a moving image program.
Figure 17:
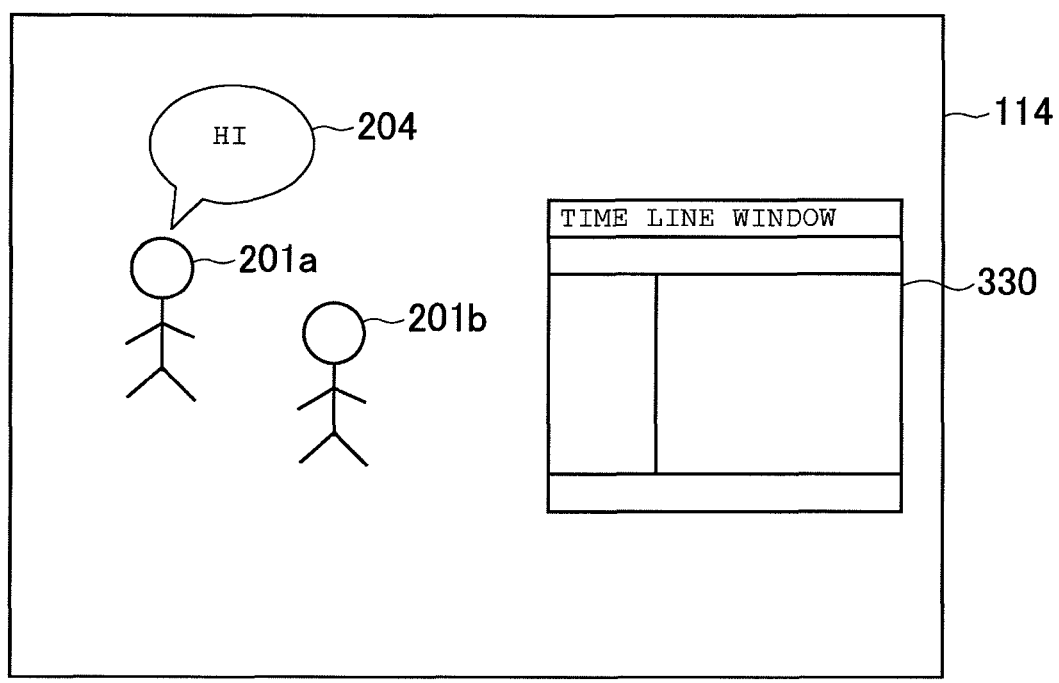
FIG. 17 illustrates an example of the display screen 114 when the time line window is opened.

The 3D model display device of the present invention supports creation of an avatar moving image program. FIG. 16 is a view illustrating an example of a window (a time line window) displayed on the display screen 114 to execute creation of a moving image program. FIG. 17 illustrates an example of the display screen 114 when the time line window is opened. When a moving image program creation mode is selected in the 3D model display device, the time line window 330 illustrated in FIG. 16 is displayed on the display screen 114. A current time indication 331 for representing a current time of the moving image displayed on the display screen 114, an environment setting indication 332 for indicating an area in which an environment of the moving image such as a camera, a sound, and a background is set, a character setting indication 336 for indicating an area in which a comment, a motion, and a position of a character (an avatar) disposed in the virtual 3D space is set, a moving image control button 345 for executing control to reproduce or stop the moving image, and a time line indication area 346 for representing a lapse of time of the moving image are displayed in the time line window 330.

A camera setting indication 333 for indicating an area in which a position, a direction, and a focus of the virtual camera in the virtual 3D space are set, a sound setting indication 334 for indicating an area in which a sound such as a background music (BGM) or sound effects at the time of watching the moving image is set, and a background setting indication 335 for indicating an area in which a background of the virtual 3D space is set are displayed below the environment setting indication 332. A camera setting area 333a for executing setting of a position, a direction, and a focus of the virtual camera, which is configured by a plurality of rectangles which are horizontally long and defined by dotted lines (a dotted line for representing a time line and a dotted line for discriminating respective setting areas), is disposed on the right side of the camera setting indication 333. In a similar manner, a sound setting area 334a for setting a sound is disposed on the right side of the sound setting indication 334, and a background setting area 335a for setting a background of the virtual 3D space is disposed on the right side of the background setting indication 335.

A character 1 setting indication 337 for indicating an area in which a comment, a motion, and a position of a character 1 disposed in the virtual 3D space are set and a character 2 setting indication 341 for indicating an area in which a comment of a character 2 disposed in the virtual 3D space is set are disposed below the character setting indication 336. The case in which motion setting of two characters of the character 1 and the character 2 is possible will be described, but a configuration in which motion setting of one, or three or more characters is possible may be employed.

A comment setting indication 338 for indicating an area in which a comment indication of the character 1 in the moving image is set, a motion setting indication 339 for indicating an area in which a motion of the character 1 in the moving image is set, and a position setting indication 340 for indicating an area in which a position of the character 1 in the virtual 3D space is set are displayed below the character 1 setting indication 337. In a similar manner, a comment setting indication 342, a motion setting indication 343, and a position setting indication 344 which relate to the character 2 are displayed below the character 2 setting indication 341.

Comment setting areas 338a and 442a for setting comment indications of characters, which are configured by a plurality of rectangles which are horizontally long and defined by dotted lines, are disposed on the right side of the comment setting indication 338 and 342. In a similar manner, motion setting areas 339a and 343a for setting motions of characters are disposed on the right side of the motion setting indications 339 and 343, and position setting areas 340a and 344a for setting positions of characters are disposed on the right side of the position setting indications 340 and 344.

When a play button 345c of a moving image control button 345 which is present in the lowest portion of the time line window 330 is clicked, the moving image is reproduced in the display screen 114 according to setting of a current moving image program. A time line cursor 346 which longitudinally cuts the respective setting areas such as the camera, the sound, the background, the comment, the motion, the position, the current time indication 331, and a content of the moving image of the display screen 114 are in correspondence relationship. When the moving image is reproduced, the current time indication 331 changes starting from "00. 00. 0" according to a lapse of time, and the time line cursor 346a moves from left to right. When a pause button 345d and a stop button 345e are clicked, reproduction of a moving image of the display screen 114 is stopped, and a change of digits of the current time indication 331 and movement of the time line cursor 346a are also stopped.

A plurality of star-shaped key icons 347 in the respective setting areas such as the camera, the sound, the background, the comment, the motion, and the position are icons representing that setting of the camera, the sound, the background, the comment, the motion, and the position is being executed. For example, key icons 347a and 347b are displayed at positions of 0 sec and 20 sec in the camera setting area 333a of the time line indication area 346. The key icon 347a relates to setting of a position and a direction of the virtual camera between 0 sec and 20 sec at which the next key icon 347b is displayed. On the other hand, the key icon 347b relates to setting of the position and the direction of the virtual camera from after 20 sec until the moving image is finished. Therefore, it can be understood that setting of the position and the direction of the virtual camera is changed at 20 sec.

Next, a method of adding the key icon 347 will be described. When reproduction of the moving image is paused or stopped, the time line cursor 346a may be moved left or right by a drag and drop. When the time line cursor 346a is moved, a content of the moving image displayed on the display screen 114 is changed together. In order to execute an edit of the moving image program, the user moves the time line cursor 346a while confirming the 2D image displayed on the display screen 114 and positions the time line cursor 346a at a time in which the key icon 347 is desired to be added. Thereafter, a key icon addition button disposed (not illustrated) on the right side of the respective setting indications is clicked. For example, in the case of desiring to add the key icon 347 for the virtual camera, a camera addition button disposed on the right side of the camera setting indication 333 is clicked. When the camera addition button is clicked, a new window is displayed, and thus automatic camera setting in which the virtual camera moves according to predetermined setting, for example, setting about what the virtual camera focuses on (for example, whether or not the virtual camera focuses the character 1 or the character 2) and how a position of the virtual camera is changed according to a lapse of time (for example, rotate about the focus, or zoom to the focus according to a lapse of time), may be added. Manual setting in which the user can set all of the position and the direction of the virtual camera in detail is possible. When setting is finished, the key icon 347 is displayed at a position in which the virtual camera setting area 333a and the time line cursor 346a cross each other. After addition of the key icon 347 is finished, when the play button 345c is clicked, the moving image is reproduced on the display screen 114 based on the added setting. In this case, due to the added key icon 347, setting of the virtual camera after time in which it is added is changed, and the setting is continued until the moving image is finished unless there is no other key icon 347 after the time.

In a similar manner, it is possible to add the key icon 347 and setting to the respective setting areas. For example, in the case of adding the key icon 347 to the sound setting area 334a, desired voice data may be selected from voice data previously stored in the 3D model display device, and in the case of adding the key icon 347 to the background setting area 335a, desired image data may be selected from image data previously stored in the 3D model display device. As the voice data and image data, voice data and image data possessed by the user himself/herself may be used.

Besides, when the key icon 347 is added to the comment setting areas 338a and 342a, a comment displayed from after a time indicated by the time line cursor 346a until a predetermined time elapses may be edited. A comment is executed by a text input. In the case in which display setting of a comment has been executed, when the moving image is reproduced, a words balloon 204 appears above the head of an avatar 201a, and a comment is displayed in the words balloon 204 as illustrated in FIG. 17.

When the key icon 347 is added to the motion setting areas 339a and 343a, a motion of the avatar 201 from a time indicated by the time line cursor 346a to a time in which a next key icon is set may be edited. The motion may be selected from among a plurality of motions stored in the 3D model display device. For example, motions such as "running", "walking", and "dancing" may be selected. A plurality of key icons 347 may be set in the motion setting areas 339a and 343a to have the avatars 201a and 201b to execute a complicated motion by combining simple motions. A set motion is repetitively executed by the avatar 201 until a content of a motion is changed by the key icon 347.

Further, the key icon 347 may be added to the position setting areas 340a and 344a to change a position of the avatar 201 in the virtual 3D space. In this case, a certain position on the display screen 114 may be selected to change a position in which the avatar 201 is standing according to a time.

Even after setting of the key icon 347 is completed and the key icon 347 is displayed in the time line window 330, the setting may be changed again by clicking the key icon 347.

The moving image program created in the above-described manner may be stored in the 3D model display device or uploaded to a web site so that other user can purchase it.

When the moving image program edited in the above-described manner is uploaded so that other user can purchase it, the moving image program is stored in a moving image program management table set in a HDD of the 3D display server. FIG. 18 is a view illustrating a moving image program management table according to an embodiment of the present invention. A setting time 402 and detailed setting 403 for a camera, a sound, a background, and a comment, a motion, and a position of the character in each moving image program are stored in the moving image program management table 401. For example, in the camera, setting 403 is "a focus: character 1, rotation" when the setting time 402 is "0 sec", and setting 403 is "a focus: character 2, zoom-up" when the setting time 402 is "20 sec". In this case, the virtual camera rotates around the character 1 focusing on the character 1 until 20 seconds elapse from after the moving image starts and steadily zooms up the character 2 focusing on the character 2 according to a lapse of time after 20 seconds has elapsed. That is, one moving image program is configured by a combination of a plurality of setting of cameras, sounds, backgrounds, and comments, motions, and positions of a character.

Information of each user is managed such that a user management table is stored in the HDD of the 3D display server. FIG. 19 is a view illustrating a user management table according to an embodiment of the present invention. A user ID 405 allocated for each of individual users, a head size 406, a bust size 407, and a head-sized body 408 which represent respective components of an avatar possessed by the user, a head data ID 409 for a head design (a face or a hairstyle) of an avatar, an edit data ID 410 for a wearing item or a moving image program which the user has edited so far, and a virtual currency 411 currently possessed by the user are stored in the user management table 404. In the 3D display device, in the case of preview-displaying in order to try an item on or watch a moving image, display data is specified based on the model data.

Next, processing when the user selects and preview-displays an item or a moving image program on a web site will be described. The user accesses the 3D model display server through the Internet from the 3D model display device. The user inputs a user ID and a password allocated to each user to log in a web site in which an item or a moving image program can be purchased.

Figure 20:
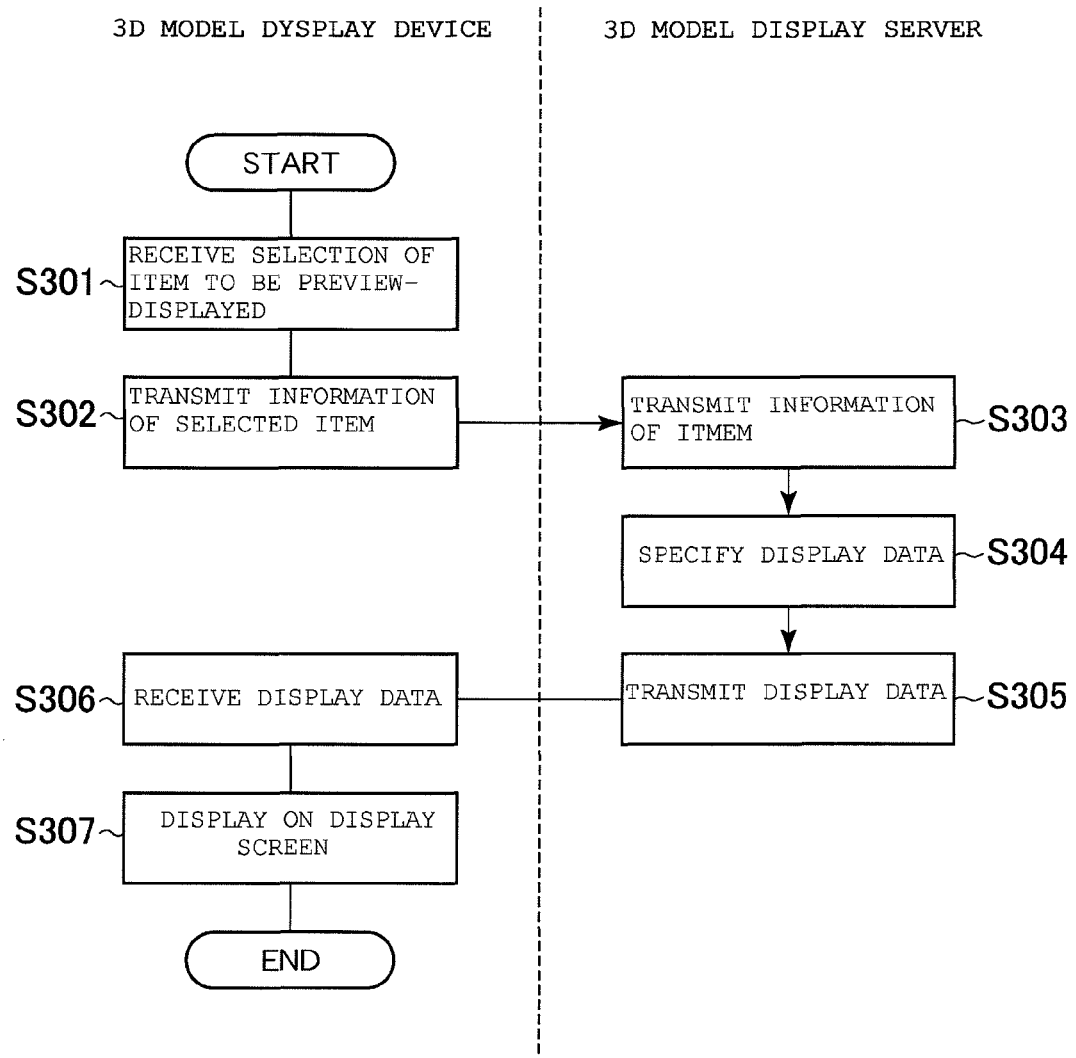
FIG. 20 is a flowchart when a preview in which a user's avatar is applied to an item or a moving image program selected by a user is displayed.

FIG. 20 is a flowchart when a preview in which the user's avatar is applied to an item or a moving image program (hereinafter, referred to as "item etc.") selected by the user is displayed. The user logs in a web site and operates the input device 103 to select an item which is desired to be preview-displayed (step S301). In the 3D model display device, information of the selected item etc. is transmitted to the 3D model display server (step S302). When the 3D model display server receives information of the selected item etc. (step S303), display data to be displayed in the 3D model display device is specified (step S304). The specified display data is transmitted to the 3D model display device (step S305). When the 3D model display device receives the display data (step S306), a preview in which the user's avatar wears the selected item or a character appeared in the selected moving image program is applied to the user's avatar is displayed on the display screen 114 (step S307).

In the case of displaying a preview in which an avatar possessed by the user himself/herself wear an item, in specifying display data in step S304, display data of the 3D model is specified based on model data such as sizes of the respective components stored in the head size 406, the bust size 407, and the head-sized body 408 of the user management table 404 and the head data ID 409 for specifying design data such as a face or a hairstyle of an avatar, and display data of a wearing item. It is necessary to change a size of the wearing item according to a change of the head size 406, the bust size 407, and the head-sized body 408 of the avatar. For example, when the wearing item is a hat, sizes of polygons which configure the hat are changed according to the head size, and so a position relationship and a large-small relationship of an avatar are maintained even though the head size of the avatar is increased. Skinning is performed according to a size change of the virtual skeleton, so that display data is specified. In the case of a jacket, display data is specified based on the bust size 407 and the head-sized body 408, and in the case of trousers, display data is specified based on the head-sized body 408. That is, a portion in which its size is based to specify display data is previously set according to a type of the wearing item. For a position relationship between the avatar and the item, a relationship between virtual skeleton coordinates and item location coordinates may be previously set.

When an item has been purchased, display data of the purchased item is downloaded to the 3D model display device. In the 3D model display device, the user can display his/her avatar wearing the purchased item on the display screen based on sizes of the respective components of the avatar possessed by him/her. The purchased item may be re-edited and resold.

In the case of displaying a preview in which a moving image program created by other user is applied to an avatar possessed by the user, in specifying display data in step S304, display data of the 3D model is specified based on model data such as sizes of the respective components stored in the head size 406, the bust size 407, and the head-sized body 408 of the user management table 404 and the head data ID 409 for specifying design data such as a face or a hairstyle of an avatar, display data of an item worn by the avatar, and the moving image program.

In the case of purchasing a moving image program created by other user, the moving image program (a program in which a camera, a sound, a background, and a comment, a motion and a position of a character are set) of the moving image program management table 401 is downloaded. In the 3D model display device, when the purchased moving image program is applied to the avatar possessed by the user, display data is specified based on model data such as sizes of respective components of his/her own avatar and head data for specifying design data such as a face or a hairstyle of an avatar, display data of an item which an avatar is wearing, and the downloaded moving image program.

Figure 21:
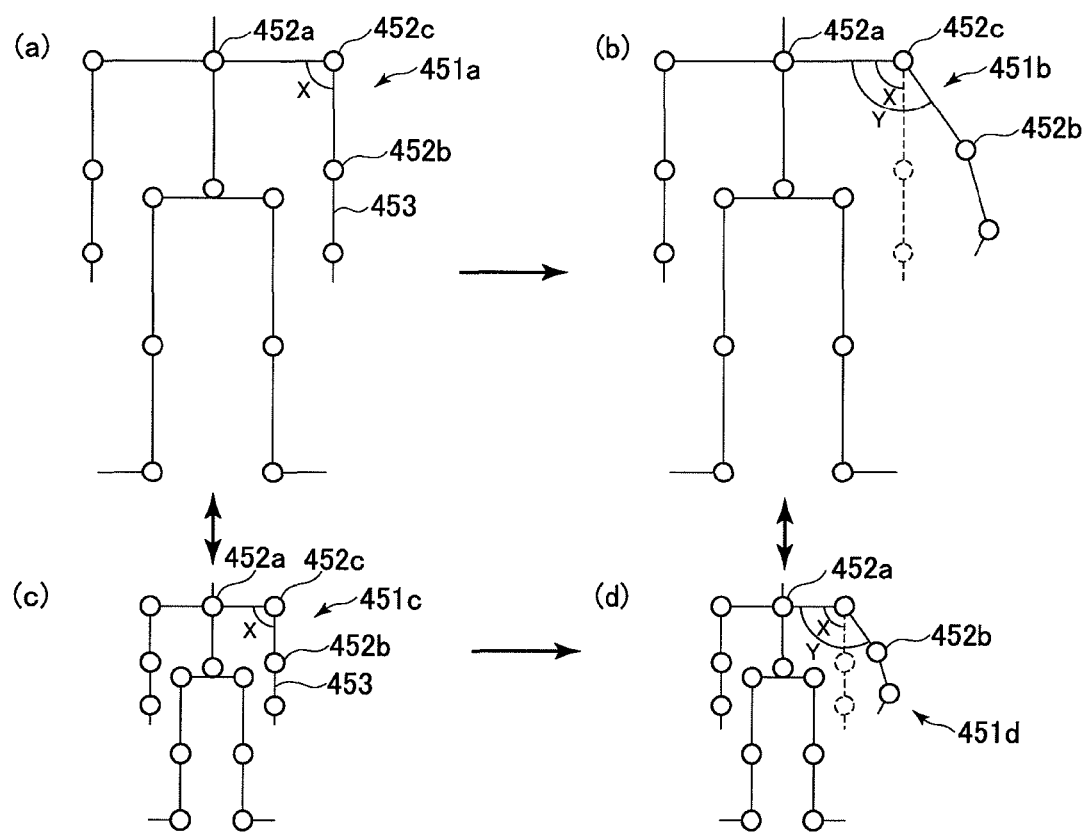
FIGS. 21A to 21D are views illustrating a virtual skeleton and a change of the virtual joints when a size of an avatar is changed.

FIGS. 21A to 21D are views illustrating a virtual skeleton and a change of the virtual joints when a size of an avatar is changed. A virtual skeleton model 451c of the avatar of FIG. 21C is one in which a head-sized body size of an avatar of a virtual skeleton model 451a of FIG. 21A is reduced to 50%. Therefore, the virtual skeleton model 451a and the virtual skeleton model 451c are in correspondence relationship. A virtual skeleton model 451b of FIG. 21B is one in which a left hand of the virtual skeleton model 451a is moved outwards and upwardly by the motion program. A virtual skeleton model 451d of FIG. 21D is one in which a head-sized body size of an avatar of the virtual skeleton model 451b of FIG. 21B is reduced to 50%. The virtual skeleton model 451b and the virtual skeleton model 451d are in correspondence relationship, and the virtual skeleton model 451d is one in which a left hand of the virtual skeleton model 451c is moved by the motion program. The virtual skeleton model 451 includes, for example, a plurality of virtual joints 452 (which are indicated by circles in FIGS. 21A to 21D) formed in movable portions such as a shoulder, an elbow, and a wrist, and virtual skeletons 453 (which are indicated by a straight line in FIGS. 21A to 21D) of a straight line form which connect the respective virtual joints 452 such as an upper arm, a lower arm, and a hand.

In the motion program used when setting the motion of the avatar using the time line window 330 as described above, according to an angle formed in the virtual joints 452 by the virtual skeleton 453 and an angle speed at the time of movement of the virtual joints 452 before and after the virtual joints 452 moves according to a lapse of time, the virtual joints 452 are moved, and a motion is applied to an avatar. Here, it is assumed that the virtual skeleton model 451a of FIG. 21A has a reference body portion size. In the virtual skeleton model 451a of FIG. 21A, an angle X formed by the virtual skeleton, which connects a virtual joint 452a (hereinafter, referred to as a "virtual neck joint") of a portion corresponding to a neck and a virtual joint 452b (hereinafter, referred to as a "virtual left elbow joint") of a portion corresponding to a left elbow with a virtual joint 452c (hereinafter, referred to as a "virtual left shoulder joint") of a portion corresponding to a left shoulder, is 90°. The motion program is executed to move the left arm of the virtual skeleton model 451 outwards and upwardly, and an angle Y becomes about 120°.

When coordinates of the virtual neck joint 452a in the virtual 3D space are (x, y, z)=(0, 0, 0), coordinates of the virtual left elbow joint 452b (3, 0, −3) are changed to (3, 0, −2.7) after one second. In a similar manner, when coordinates of the virtual neck joint 452a of the virtual skeleton model 451c of FIG. 21C in the virtual 3D space are (x, y, z)=(0, 0, 0), coordinates of the virtual left elbow joint 452b are changed to (x, y, z)=(1.5, 0, −1.5). In this case, the angles X, the angles Y, and the angle speeds before and after the motion is executed have predetermined values, and thus the virtual left elbow joint 452b is moved up to (1.5, 0, −1.35). Therefore, a moving distance of the virtual left elbow joint 452b of the virtual skeleton model 451c is in proportion to a body portion size ratio and is reduced to 50% of the virtual skeleton model 451a. Using the above-described method, the motion program can change the moving distance and the moving speed of the virtual joint according to a size of a component stored in the user management table 404 while maintaining a direction in which the virtual joint is moved. Therefore, a motion of an avatar can be displayed without any discomfort.

Figure 22:
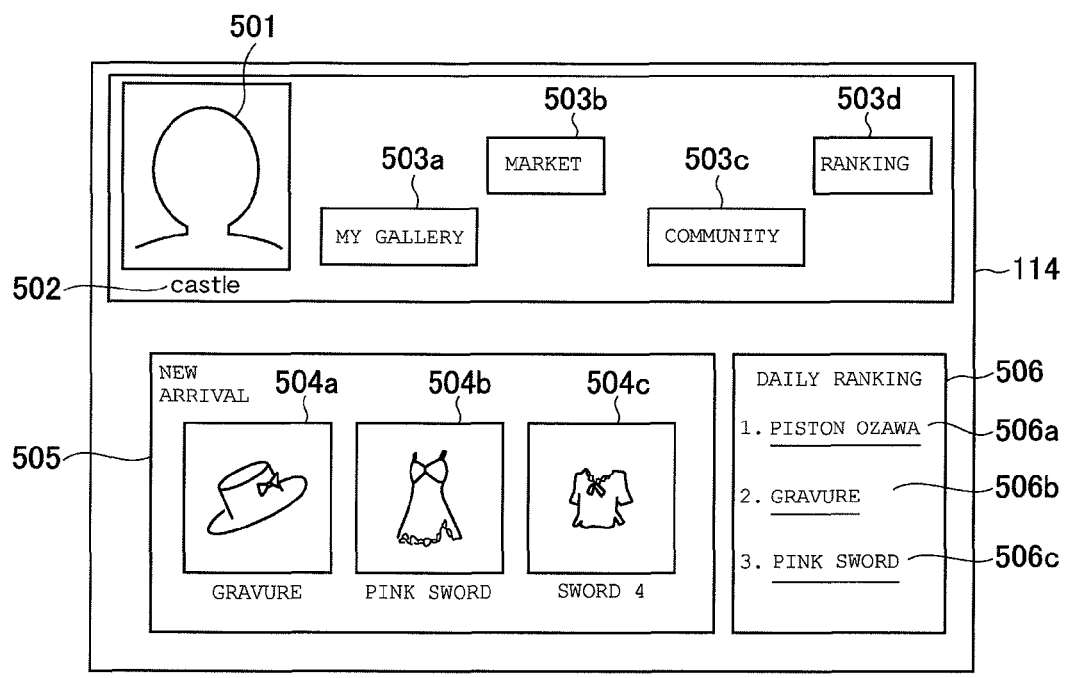
FIG. 22 illustrates an example of a display screen of a 3D model display device according to an embodiment of the present invention.

FIG. 22 illustrates an example of the display screen 114 of the 3D model display device according to an embodiment of the present invention. The 3D model display device connected with the 3D model display server of the present invention via a communication line performs access to the 3D model display sever through a browser. The user who has accessed the 3D model display server may input a user ID and a password which are allocated to each user to log in a user's own management screen (my page). In the 3D model display server, the user management table is set, and a user ID, a password corresponding to the user ID, and a user name are stored. When the user ID and the password input by the user are identical to the user ID and the corresponding password stored in the user management table, the user is allowed to log in the user's own management screen, so that the display screen 114 illustrated in FIG. 22 is displayed.

A user name registered by the user and an icon 501 selected or created by the user are displayed on the upper-left side of the display screen 114 of FIG. 22, and the user name 502 is displayed below the icon 501. A hyperlink 503a for displaying a "my gallery" screen for performing management for a cloth, a hairstyle, an item, and an accessory wore by a character created by the user, a motion, and a movie (hereinafter, referred to as "design etc.") is provided on the left side slightly from the upper center of the display screen 114. A hyperlink 503b for displaying a "market" screen for purchasing the design etc. created by other user, a hyperlink 503c for displaying a "community" screen for participating in various communities, and a hyperlink 503d for displaying a "ranking" screen for browsing through popular items or moving images are provided on the right side of "my gallery".

A new-arrival corner display area 505 in which "gravure", "pink sword", and "sword 4" which are the design etc. 504 (created by other user) of new-arrival items which can be recently received are displayed is disposed on the center of the display screen 114 of FIG. 22. When the images such as "gravure" are clicked, a screen for purchasing the respective design etc. 504 is displayed. Below the new arrival corner display area 505, a newest information corner (not illustrated) is disposed, and information such as a service provided in this web site is displayed in a time-series manner. On the right side of the display screen 114 of FIG. 22, a daily ranking indication area 506 is disposed, and the design etc. having high purchase frequency or high user evaluation ("piston Ozawa" 560a, "gravure" 506b, and "pink sword" 506c) among purchasable design etc. 504 is displayed. When the images are clicked, a screen for purchasing the respective design etc. 504 is displayed. Further, even though not illustrated, tags of "my friend list" for displaying a list of other users which are personally acquainted, "intimate members" for displaying a list of closer users than users registered in the "my friend list", and "community list" for displaying a list of communities to which the user belongs are displayed. When the tags are clicked, respective contents are displayed on the display screen 114.

Figure 23:
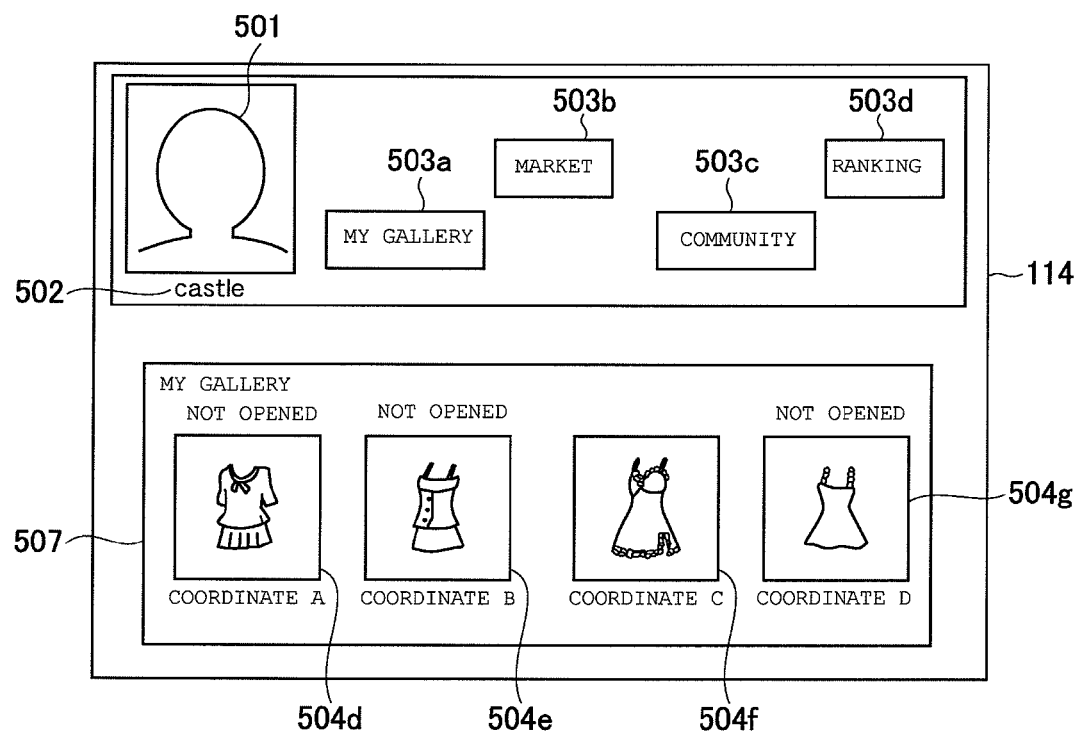
FIG. 23 illustrates an example of a display screen of a 3D model display device according to an embodiment of the present invention.

FIG. 23 illustrates an example of the display screen 114 of the 3D model display device according to an embodiment of the present invention. When the hyperlink 503a for displaying the "my gallery" screen displayed on the upper portion of the display screen 114 illustrated in FIG. 22 is clicked, the display screen 114 illustrated in FIG. 23 is displayed. A plurality of design etc. 504 created by the user is displayed in the lower portion of the display screen 114. A design etc. 504f which is at a second position from the right among the design etc. 504 displayed on the display screen 114 is opened to the public so that other user can purchase it, and nothing is displayed above an image of the design etc. 504f. On the other hand, the other design etc. 504d, 504e, and 504g are not opened to the public in a current stage for other user to purchase, and "not opened" is displayed above images of the design etc. 504d, 504e, and 504g. A design name (or a motion name or a movie name) set to the design etc. 504 is displayed below each design etc. 504. An edit data ID of the design etc. 504 created by the user is stored in the user management table, and data such as a cloth, a hairstyle, an item, and an accessory, worn by the character, which are crated by the user, motion data, and movie data are specified based on the edit data ID.

Figure 24:
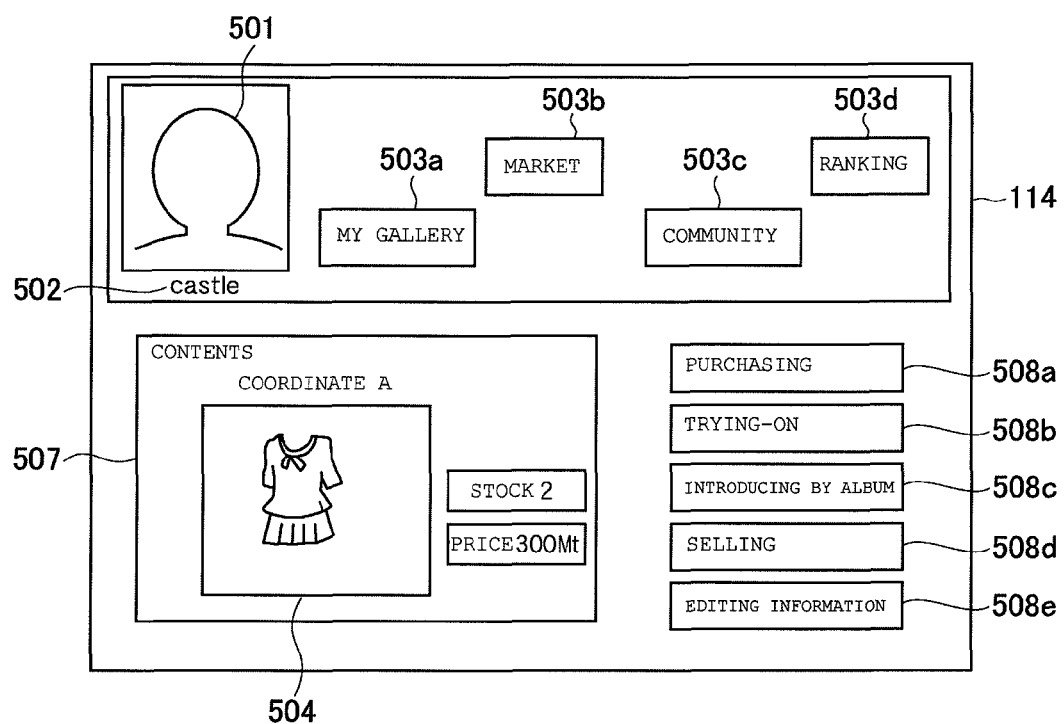
FIG. 24 illustrates an example of a display screen of a 3D model display device according to an embodiment of the present invention.
Figure 25:
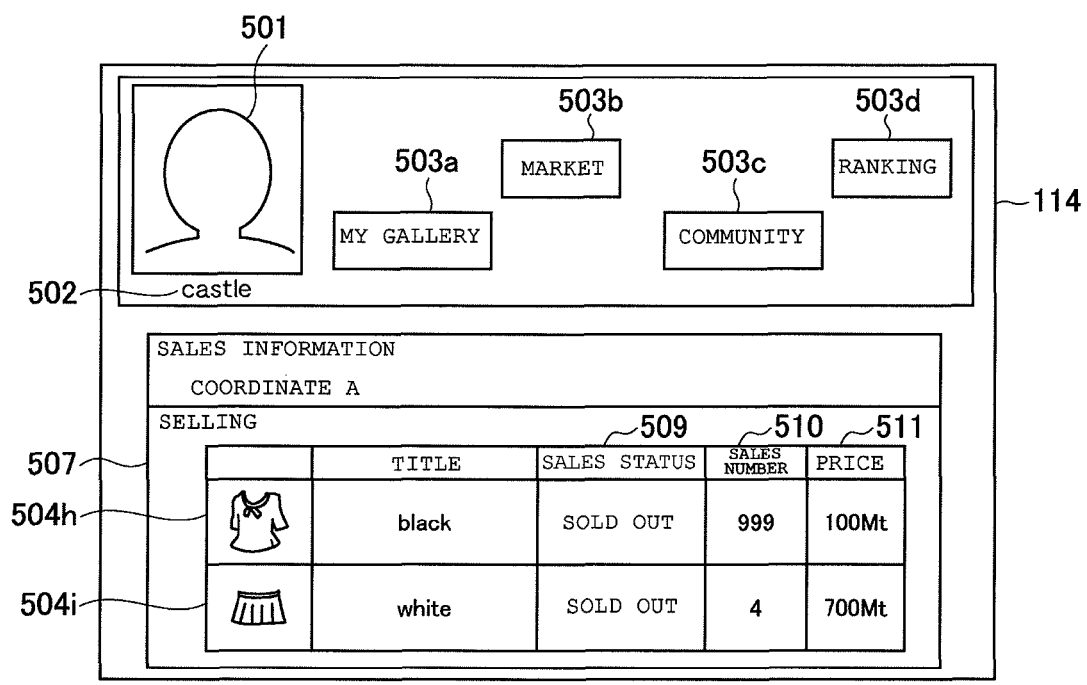
FIG. 25 illustrates an example of a display screen of a 3D model display device according to an embodiment of the present invention.

When the user clicks the image of the design etc. 504 which is not opened to the public, the display screen 114 of FIG. 24 is displayed. In this case, a "coordinate A" as a design in which a cloth, an accessory, and a hairstyle worn by the character are totally coordinated will be described. The "coordinate A" is displayed on a content display area 507 on the left from the center of the display screen 114. Selection buttons 508a, 508b, 508c, 508d, and 508e such as "purchasing" "trying-on", "introducing by an album", "selling", and "editing information" are displayed on the right side of the display screen 114. When the "selling" selection button 508a is clicked, a screen for managing sales information is displayed as illustrated in FIG. 25. The "coordinate A" includes a plurality of design data such as a hairstyle, an accessory, and a cloth, and each design data can be sold. The "coordinate A" is displayed above the content display area 507b, and design etc. 504h and 504i such as "black" and "white" which configure the "coordinate A" are displayed below the content display area 507b.

For each design data, a sale status 509 (any of sold out, on sale, or before sale), a sales number 510, and a price 511 are displayed. The price 511 is determined based on a virtual currency "Mt", and the virtual currency "Mt" may be used to purchase or sell design data, motion data, movie data (design data etc.). For design data in which the sale status 509 is set to "before sale", the user can arbitrarily set the sales number 510 and the price 511. When the user inputs the sales number 510 and the price 511 and clicks a confirmation button which is not illustrated in FIG. 25, a confirmation screen is displayed. The user confirms the confirmation screen and confirms whether or not the sales number 510 and the price 511 of each design data are properly input according to the user's intent. When a determination button is clicked, design data which configures the "coordinate A" designated by the user is opened to other users. The design data may be purchased until the number purchased by other users reaches the sales number 510 set by the user.

Figure 26:
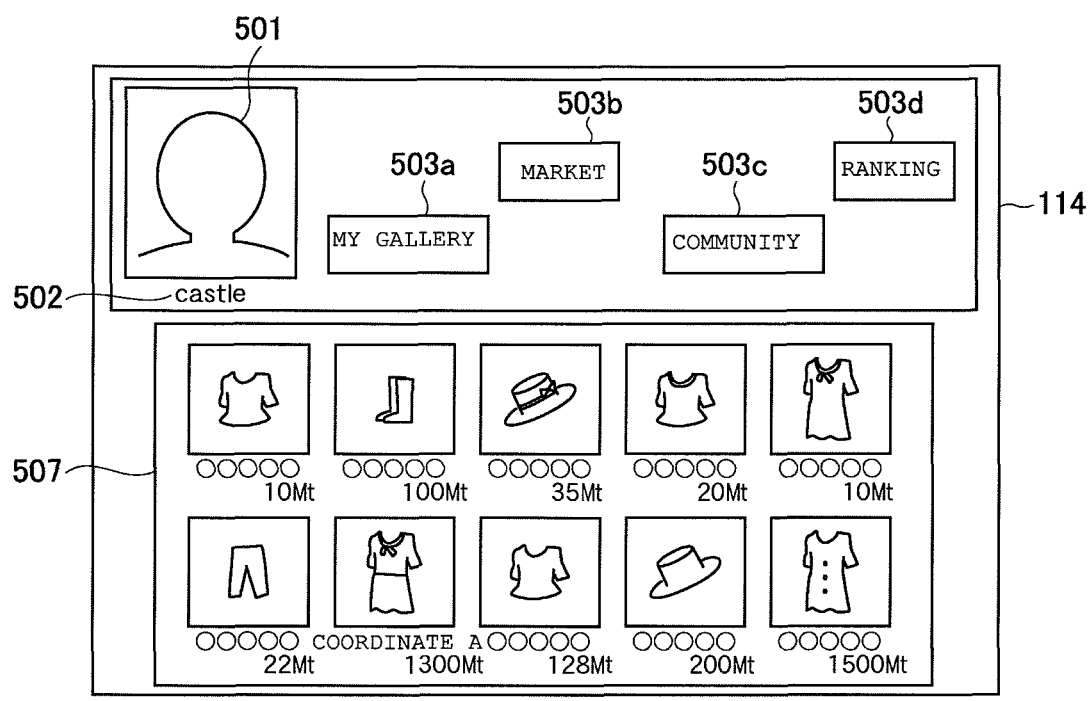
FIG. 26 illustrates an example of a display screen of a 3D model display device according to an embodiment of the present invention.

The user may click the hyperlink 503b for displaying the "market" screen disposed in the upper portion of the display screen 114 to confirm design data which is opened by other user or the user on the content display area 507. It can be seen from FIG. 26 that images of a plurality of design data are displayed on the content display area 507, and the "coordinate A" (second line from the top and second from the left) can be purchased. A design name and a price are displayed below the image displayed for each design data. When the image indicating the "coordinate A" of FIG. 26 is clicked, a screen of FIG. 27 is displayed.

Figure 27:
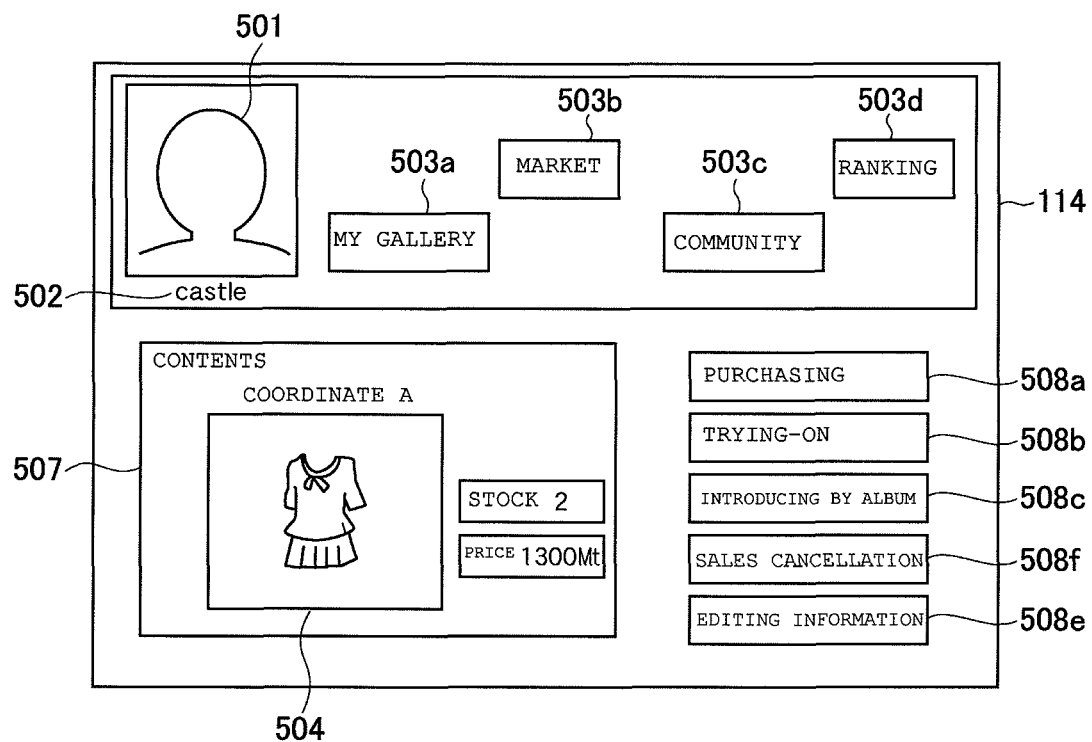
FIG. 27 illustrates an example of a display screen of a 3D model display device according to an embodiment of the present invention.

Selection buttons 508a, 508b, 508c, 508f, and 508e of "purchasing", "trying-on", "introducing by an album", "sales cancellation", and "editing information" are disposed in the right side of FIG. 27, and the user may select the selection button 508f of "sales cancellation" when the user has created the "coordinate A". The user may click the selection button 508f of "sales cancellation" to determine sales cancellation. In this case, design data which is already opened to the public may enter a "not opened" state.

The user may click the selection button 508a of "purchasing" to purchase design data. An amount of the virtual currency currently possessed by the user is stored in the user management table, and design data, motion data, and movie data (hereinafter, referred to as "design data etc.") which are higher in price than the amount of the virtual currency cannot be purchased. When the design data etc. which the user has created and started selling is purchased by other user, a price set to one sales number is added to the virtual currency possessed by the user which is a sales source. In contrast, the virtual currency possessed by other user who has purchased design data is subtracted by a set price.

The design data etc. purchased through the 3D model display server has been created by other user but may be re-edited by the user who has purchased it using the 3D model display device. Re-edited design data etc. may be re-sold by the user who has re-edited it. When the user does not want other user to edit the design data etc. which has been edited by the user, the user may set that design data cannot be edited by other user and then start to sell it.

When the user clicks the selection button 508b of "trying-on", a preview display about how an avatar possessed by the user which has worn a cloth, a hairstyle, an item, and accessory which is desired to be tried on is displayed is performed. Since the respective users have avatars which are different in face shape or expression, and head size, body portion size, and bust portion size, the user can confirm whether or not a cloth, a hairstyle, an item, and accessory go well with the avatar of the user, by trying them on. The head size, the body portion size, and the bust portion size of an avatar possessed by the user are managed in the user management table, and display data related to a preview display displayed on the display screen 114 of the 3D model display device is dynamically generated by the 3D model display server based on the head size, the body portion size, and the bust portion size which are managed in the user management table. For example, when design data to be preview-displayed relates to a hairstyle, a size of the hairstyle at the time of preview display is determined according to the head size of the avatar, and then a preview display is performed.

When design data to be preview-displayed relates to an upper body or a lower body, a size of a cloth at the time of preview display is determined according to the body portion size of the avatar, and then a preview display is performed. In the present invention, the body portion size of the avatar may be changed in the 3D model display device, but a distance ratio between virtual joints which configure the virtual skeleton disposed in the avatar is constantly maintained. That is, even though the body portion size of the avatar is changed, for example, a distance between the virtual joints of the wrist portion and the elbow portion of the virtual skeleton and a distance between the virtual joints of the elbow portion and the shoulder portion always have a constant ratio. Therefore, in the case of preview-displaying a try-on state of an avatar, a size of display data of a cloth to be preview-displayed is determined according to the body portion size, and thus a problem in that a length of a cloth is appropriate but a sleeve is shortened does not occur. In the case of editing or viewing purchased design data in the 3D model display device without the 3D model display server, an avatar to which purchased design data is applied is displayed in the same manner.

Figure 28:
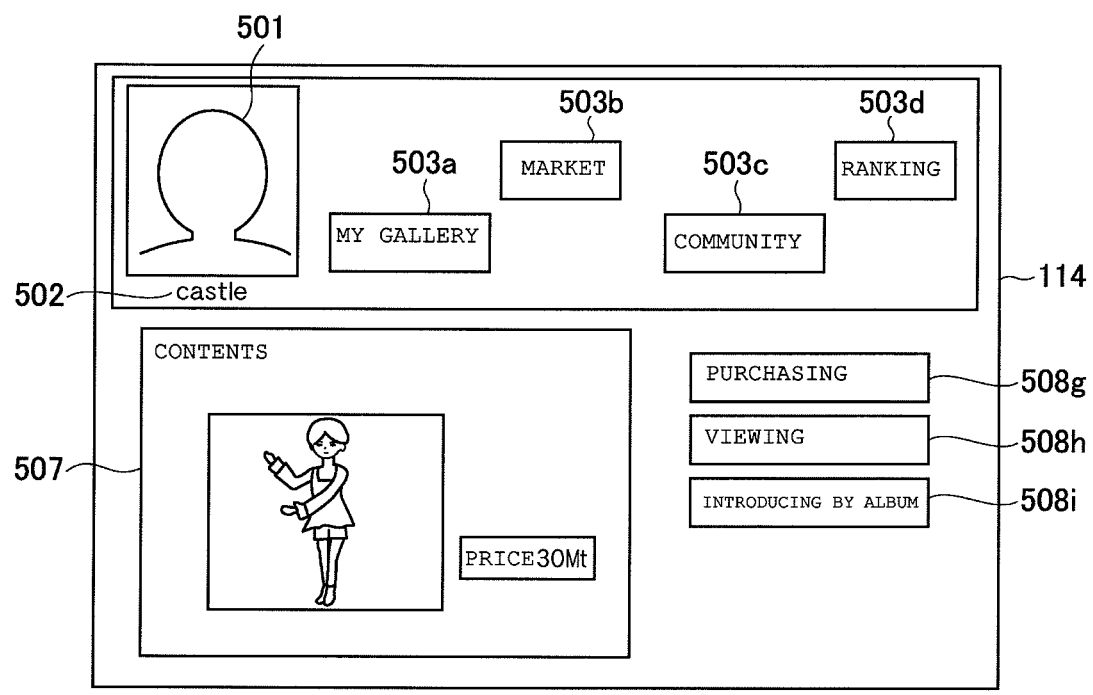
FIG. 28 illustrates an example of a display screen of a 3D model display device according to an embodiment of the present invention.

The purchase and selling of design data have been described hereinbefore, but as illustrated in FIG. 28, motion data (or movie data) edited by the user may be sold. Selection buttons 508g, 508h, and 508i of "purchasing", "viewing", and "introducing by an album" are disposed on the right side of the display screen 114 of FIG. 28. The user may click the selection button 508g of "purchasing" to purchase motion data displayed on the content display area 507.

When the selection button 508h of "viewing" is clicked, a preview display about how an avatar possessed by the user to which the same motion is conferred is displayed is performed. Since the respective users have avatars which are different in face shape or expression, and head size, body portion size, and bust portion size, the user can confirm whether or not a motion go well with the avatar of the user or is a funny motion. The head size, the body portion size, and the bust portion size of the avatar possessed by the user are managed in the user management table, and motion data related to the preview display displayed on the display screen 114 of the 3D model display device is dynamically generated by the 3D model display server based on the head size, the body portion size, and the bust portion size which are managed in the user management table.

There is a case in which a plurality of characters appears in a movie according to movie data. Therefore, in the case of selecting the selection button 508h of "viewing" to preview-display movie data, the user may select a character to appear as an avatar possessed by the user. For example, all of characters may be filled with avatars possessed by the user. Or, one of characters may be filled with an avatar possessed by the user, and characters set in movie data may be used as the other characters. When the user has a plurality of avatars, an avatar may be allocated to each of characters in a movie.

In order to open or sell design data or character data edited by using the 3D model display device on the web site, it is necessary to upload the data to the 3D model display server. In this case, edited design data is transmitted together with a user ID, and the design data and edit data ID corresponding thereto are managed in the user management table of the 3D model display server. In the case of re-editing design data purchased through the web site by using the 3D model display device, it is necessary to download the design data from the 3D model display sever. In this case, a user ID is transmitted from the 3D model display device to the 3D model display server, and design data to be possessed by the user is downloaded to the 3D model display device.

What is claimed is:

1. A three-dimensional (3D) design support apparatus which supports creation of a surface design of a 3D model, the 3D design support apparatus comprising:
- a model data storage which stores model data of respective components which configure a 3D model disposed in a virtual 3D space;
- a model data processor which changes a virtual skeleton of the respective components set to the 3D model according to an operation of an input device by a user to change model data of the respective components stored in the model data storage;
- a model data calculating processor which calculates model data of the 3D model according to the changed model data of the respective components; and
- a 3D model display device which renders the model data of the 3D model calculated by the model data calculator and displays the rendered model data as a two-dimensional (2D) image on a display device,
- wherein the model data processor is configured to continually change a size of a component of the respective components during execution of a motion program that confers a predetermined motion to the 3D model.

2. The 3D design support apparatus according to claim 1, the 3D design support apparatus further comprising:
- an expansion view storage which stores an expansion view in which a surface shape of the 3D model is two-dimensionally expanded;
- an expansion view correspondence relationship storage which stores a correspondence relationship between the model data and the expansion view of the respective components;
- an expansion view editor which edits the expansion view stored in the expansion view storage according to an operation of the input device by a user;
- a model data editor which edits the model data stored in the model data storage according to an operation of the input device by the user;
- an edit method switcher which selects one of the expansion view editor and the model data editor to execute an edit through the input device according to an operation of the input device by the user; and
- a 3D model data calculator which calculates the model data of the 3D model according to the model data edited by the model data editor, the expansion view edited by the expansion view editor, and a correspondence relationship between the model data and the expansion view stored in the expansion view correspondence relationship storage.

3. The 3D design support apparatus according to claim 1, the 3D design support apparatus further comprising:
- a motion program storage which stores the motion program which confers a the predetermined motion to the 3D model in the virtual 3D space; and
- a motion program processor which executes the motion program based on the model data of the 3D model calculated by the model data calculator.

4. The 3D design support apparatus according to claim 1, the 3D design support apparatus further comprising:
- an expansion view storage which stores an expansion view in which a surface shape of the 3D model is two-dimensionally expanded;
- an expansion view correspondence relationship storage which stores a correspondence relationship of the model data of the respective components stored in the model data storage and the expansion view stored in the expansion view storage;
- a 2D image storage which stores a 2D image selected by the user;
- a superimposing displayer which superimposes the expansion view stored in the expansion view storage with the 2D image stored in the 2D image storage and displays the superimposed image on a display device;
- a position changer which changes a position of at least one of the expansion view and the 2D image which are superimposed and displayed by the superimposing displayer according to an operation of the input device by the user;
- an image paster which pastes the 2D image superimposed with the expansion view to the model data stored in the model data storage and displayed according to the correspondence relationship between the model data and the expansion view of the respective components stored in the expansion view correspondence relationship storage; and
- an image pasting model displayer which displays the model data to which the 2D image is pasted by the image paster on the display device.

5. A non-transitory computer readable medium that stores an executable computer program which causes a computer to execute creation of a surface design of a 3D model, the computer readable medium comprising:
- an executable model data storing code segment stored on the computer readable medium that, when executed, causes the computer to store model data of respective components which configure a 3D model disposed in the virtual 3D space;
- an executable model data changing code segment stored on the computer readable medium that, when executed, causes the computer to change a virtual skeleton of the respective components set to the 3D model according to an operation of an input device by a user to change model data of the respective components stored in the model data storage;
- an executable model data calculating code segment stored on the computer readable medium that, when executed, causes the computer to calculate model data of the 3D model according to the changed model data of the respective components; and
- an executable 3D model displaying code segment stored on the computer readable medium that, when executed, causes the computer to render the model data of the 3D model calculated by a model data calculating code segment and display the rendered model data as a two-dimensional (2D) image on a display device,
- wherein a size of a component of the respective components is continually changed during execution of a motion program that confers a predetermined motion to the 3D model.

6. The 3D design support apparatus according to claim 3, wherein the motion program defines a motion according to angles with respect to an angle of virtual joints formed by the virtual skeleton, the model data processor changes the model data by changing a ratio of sizes of the respective components while the motion program is executed, and the model data calculating processor calculates the model data of the 3D model according to the changed model data of the respective components while the motion program is executed.

7. A three-dimensional (3D) model display server connected with a 3D model display device, which displays a 3D model, via a communications network, the 3D model display server comprising:

a model data receiver which receives edit model data, which is edited with the 3D model display device and relates to setting data related to sizes of respective components which configure the 3D model and display data of the respective components, from the 3D model display device;

a model data storage which stores the edit model data received by the model data receiver;

a wearing item display data storage which stores a plurality of wearing item display data;

a wearing item correspondence relationship storage which stores a correspondence relationship between each wearing item and each component which configures the 3D model;

a wearing item information receiver which receives wearing item information, which relates to the wearing item which is worn by the 3D model and is selected with the 3D model display device, from the 3D model display device;

a wearing item display data changer which changes, with respect to the wearing item corresponding to the wearing item information received by the wearing item information receiver, display data of the wearing item stored in the wearing item display data storage according to the setting data related to the sizes of the respective components stored in the model data storage and a relationship between the wearing item and the respective components stored in the wearing item correspondence relationship storage;

a model display data specifier which specifies the display data of the 3D model based on the setting data related to the sizes of the respective components and the display data of the respective components stored in the model data storage and the display data of the wearing item changed by the wearing item display data changer;

a model data changer configured to continually change a size of a component of the respective components during execution of a motion program that confers a predetermined motion to the 3D model; and a model display data transmitter which transmits the display data of the 3D model specified by the model display data specifier to the 3D model display device.

8. A three-dimensional (3D) model display system comprising the 3D model display server according to claim 7, and the 3D model display device which displays a 3D model allocated to each user, the 3D model display device comprising:

a model data editor which edits the setting data related to sizes of respective components which configure the 3D model and display data of the respective components according to an operation of an input device by a user;

a model data transmitter which transmits edit model data, edited by the model data editor, which relates to the setting data related to the sizes of the respective components which configure the 3D model and display data of the respective components, to the 3D model display server;

a wearing item selection receiver which receives a selection of a wearing item to be worn by the 3D model according to an operation of the input device by the user; and a wearing item information transmitter which transmits wearing item information related to the wearing item received by the wearing item selection receiver to the 3D model display server, wherein the 3D model display device displays the display data of the 3D model received from the 3D model display server as a two-dimensional image.

9. The 3D model display system according to claim 8, wherein the 3D model display device further comprises a wearing item editor which edits the display data of the wearing item, and the wearing item selected by the wearing item selection receiver is a wearing item in which display data is edited by a wearing item editor of a different 3D model display device.

10. A non-transitory computer readable medium that stores an executable computer program which causes a three-dimension (3D) model display server to execute creation of display data of a 3D model, the 3D model display server being connected with a 3D model display device, which displays the 3D model, via a communications network, the non-transitory computer readable medium comprising:

a model data receiving code segment that, when executed, receives the edit model data, which is edited with the 3D model display device and relates to setting data related to sizes of respective components which configure the 3D model and display data of the respective components, from the 3D model display device;

a model data storing code segment that, when executed, stores the edit model data received by the model data receiving code segment;

a wearing item display data storing code segment that, when executed, stores a plurality of wearing item display data;

a wearing item correspondence relationship storing code segment that, when executed, stores a correspondence relationship between each wearing item and each component which configures the 3D model;

a wearing item information receiving code segment that, when executed, receives the wearing item information, which relates to the wearing item which is worn by the 3D model and is selected with the 3D model display device, from the 3D model display device;

a wearing item display data changing code segment that, when executed, changes, with respect to the wearing item corresponding to the wearing item information received by the wearing item information receiving code segment, display data of the wearing item stored in a wearing item display data storage according to the setting data related to the sizes of the respective components stored in a model data storage and a relationship between the wearing item and the respective components stored in a wearing item correspondence relationship storage;

a model data changing code segment, that when executed, continuously changes a size of a component of the respective components during execution of a motion program that confers a predetermined motion to the 3D model;

a model display data specifying code segment, that when executed, specifies the display data of the 3D model based on the setting data related to the sizes of the respective components and the display data of the respective components stored in the model data storage and the display data of the wearing item changed by the wearing item display data changing code segment; and a model display data transmitting code segment that, when executed, transmits the display data of the 3D model specified by the model display data specifying code segment to the 3D model display device.

11. A three-dimensional (3D) model display method performed by a 3D model display server connected with a 3D model display device, which displays a 3D model, via a communications network, the method comprising:

receiving, with a communications interface, edit model data, which is edited with the 3D model display device and relates to setting data related to sizes of respective components which configure the 3D model and display data of the respective components, from the 3D model display device;

storing, in a memory, the edit model data received by the communications interface;

storing, in the memory, a plurality of wearing item display data;

storing, in the memory, a correspondence relationship between each wearing item and each component which configures the 3D model;

receiving, with the communications interface, wearing item information, which relates to the wearing item which is worn by the 3D model and is selected with the 3D model display device, from the 3D model display device;

changing, with a processor, with respect to the wearing item corresponding to the wearing item information received by the communications interface, display data of the wearing item stored in the memory according to the setting data related to the sizes of the respective components stored in the memory and a relationship between the wearing item and the respective components stored in the memory;

specifying, with the processor, the display data of the 3D model based on the setting data related to the sizes of the respective components and the display data of the respective components stored in the memory and the display data of the wearing item changed by the processor;

continually changing a size of a component of the respective components during execution of a motion program that confers a predetermined motion to the 3D model; and transmitting, with the communications interface, the display data of the 3D model specified by the processor to the 3D model display device.

12. A three-dimensional (3D) model display server connected with a 3D model display device, which displays a 3D model, via a communications network, the 3D model display server comprising:

a model data receiver which receives edit model data, which is edited with the 3D model display device and relates to setting data related to sizes of respective components which configure the 3D model and display data of the respective components, from the 3D model display device;

a model data storage which stores the edit model data received by the model data receiver;

a moving image program storage which stores moving image programs which have the 3D model execute a predetermined motion;

a moving image program information receiver which receives the moving image program information, which relates to the moving image program which has the 3D model execute a predetermined motion and is selected with the 3D model display device, from the 3D model display device, a moving image data specifier which specifies moving image data of a moving image program during execution of the moving image program to continually edit a size of a component of the respective components stored in the model data storage, the moving image program corresponding to the moving image program information received by the moving image program information receiver among the moving image programs stored in the moving image program storage; and a moving image data transmitter which transmits the moving image specified by the moving image data specifier to the 3D model display device.

13. The 3D model display server according to claim 12, wherein the moving image program moves virtual joints, which configure a virtual skeleton set to the 3D model, to different positions according to a lapse of program execution time to confer a motion to the 3D model, and wherein the virtual joints are moved to different positions according to predetermined angles with respect to an angle of virtual joints formed by the virtual skeleton.

14. The 3D model display server according to claim 12, wherein the moving image program generates a voice by predetermined voice data according to a lapse of program execution time, displays a text according to a lapse of program execution time, and/or changes a position, a focus, or a direction of a virtual camera which displays a two-dimensional image according to a lapse of program execution time.

15. The 3D model display server according to claim 12, wherein the setting data related to sizes of the respective components comprises data related to a ratio of sizes of a virtual skeleton set to the 3D model.

16. A three-dimensional (3D) model display system comprising the 3D model display server according to claim 12 and the 3D model display device which displays a 3D model allocated to each user, the 3D model display device comprising:

a model data editor which edits the setting data related to sizes of respective components which configure the 3D model and display data of the respective components according to an operation of an input device by a user;

a model data transmitter which transmits edit model data, edited by the model data editor, which relates to the setting data related to the sizes of the respective components which configure the 3D model and display data of the respective components, to the 3D model display server;

a moving image program selection receiver which receives a selection of a moving image program which has the 3D model execute a predetermined motion according to an operation of the input device by the user; and a moving image program information transmitter which transmits moving image program information related to the moving image program received by the moving image program selection receiver to the 3D model display server, wherein the 3D model display device displays the moving image data received from the 3D model display server as a two-dimensional image.

17. The 3D model display system according to claim 16, wherein the 3D model display device further comprises a moving image program editor which edits the moving image program, and wherein the moving image program selected by the moving image program selection receiver is a moving image program edited by a moving image program editor of a different 3D model display device.

18. A non-transitory computer readable medium that stores an executable computer program which causes a three-dimensional (3D) model display server to execute creation of a display data of a 3D model, the 3D model display server being connected with a 3D model display device, which displays the 3D model, via a communications network, the non-transitory computer readable medium comprising:
   a model data receiving code segment that, when executed, receives the edit model data, which is edited with the 3D model display device and relates to setting data related to sizes of respective components which configure the 3D model and display data of the respective components, from the 3D model display device;
   a model data storing code segment that, when executed, stores the edit model data received by the model data receiving code segment;
   a moving image program storing code segment that, when executed, stores moving image programs which have the 3D model execute a predetermined motion;
   a moving image program information receiving code segment that, when executed, receives the moving image program information, which relates to the moving image program which has the 3D model execute a predetermined motion and is selected with the 3D model display device, from the 3D model display device;
   a moving image data specifying code segment that, when executed, specifies moving image data of a moving image program while executing the moving image program to continually edit a size of a component of the respective components stored in the model data storage, the moving image program corresponding to the moving image program information received by the moving image program information receiving code segment among the moving image programs stored in the moving image program storage; and
   a moving image data transmitting code segment that, when executed, transmits the moving image data specified by the moving image data specifying code segment to the 3D model display device.

19. A three-dimensional (3D) model display method performed by a 3D model display server connected with a 3D model display device, which displays a 3D model, via a communications network, the method comprising:
   receiving, with a communications interface, edit model data, which is edited with the 3D model display device and relates to setting data related to sizes of respective components which configure the 3D model and display data of the respective components, from the 3D model display device;
   storing, in a memory, the edit model data received by the communications interface;
   storing, in a memory, moving image programs which have the 3D model execute a predetermined motion;
   receiving, with the communications interface, the moving image program information, which relates to the moving image program which has the 3D model execute a predetermined motion and is selected with the 3D model display device, from the 3D model display device;
   specifying, with a processor, moving image data of a moving image program while executing the moving image program to continually edit a size of a component of the respective components stored in the memory, the moving image program corresponding to the moving image program information received by the communications interface among the moving image programs stored in the memory; and
   transmitting, with the communications interface, the moving image data specified by the processor to the 3D model display device.

* * * * *